US009378935B2

(12) United States Patent
Takeuchi et al.

(10) Patent No.: US 9,378,935 B2
(45) Date of Patent: Jun. 28, 2016

(54) GEIGER-MULLER COUNTER TUBE AND RADIATION MEASUREMENT APPARATUS

(71) Applicant: NIHON DEMPA KOGYO CO., LTD., Tokyo (JP)

(72) Inventors: Toshiaki Takeuchi, Saitama (JP); Kunio Hamaguchi, Saitama (JP); Kuichi Kubo, Saitama (JP); Kozo Ono, Saitama (JP); Noritoshi Kimura, Saitama (JP); Takaharu Fukushima, Saitama (JP)

(73) Assignee: NIHON DEMPA KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/558,730

(22) Filed: Dec. 3, 2014

(65) Prior Publication Data

US 2015/0155145 A1    Jun. 4, 2015

(30) Foreign Application Priority Data

Dec. 4, 2013   (JP) ................ 2013-251432
Dec. 17, 2013  (JP) ................ 2013-259691
Mar. 20, 2014  (JP) ................ 2014-058613
Jun. 18, 2014  (JP) ................ 2014-124849
Oct. 7, 2014   (JP) ................ 2014-206317

(51) Int. Cl.
*G01T 1/18* (2006.01)
*H01J 47/08* (2006.01)

(52) U.S. Cl.
CPC .. *H01J 47/08* (2013.01); *G01T 1/18* (2013.01)

(58) Field of Classification Search
CPC ....................................................... G01T 1/18
See application file for complete search history.

(56) References Cited

U.S. PATENT DOCUMENTS 3,665,189 A * 5/1972 Maillot ................ 250/385.1
5,502,354 A * 3/1996 Correa et al. .......... 315/111.01

FOREIGN PATENT DOCUMENTS

JP          59-5983          1/1984

* cited by examiner

*Primary Examiner* — David Porta
*Assistant Examiner* — Hugh H Maupin
(74) *Attorney, Agent, or Firm* — Jianq Chyun IP Office

(57) ABSTRACT

A Geiger-Muller counter tube includes a cylindrical enclosing tube, an anode electrode, a cylindrical cathode electrode, an inert gas, and a quenching gas. The cylindrical enclosing tube has a sealed space. The anode electrode is disposed inside the space and formed in a rod shape. The cylindrical cathode electrode surrounds a peripheral area of the anode electrode inside the space to have an opening. The inert gas and the quenching gas are sealed inside the space. At least one of the anode electrode and the cathode electrode includes a plurality of electrodes inside the enclosing tube.

12 Claims, 25 Drawing Sheets

GEIGER-MULLER COUNTER TUBE AND RADIATION MEASUREMENT APPARATUS

CROSS-REFERENCE TO RELATED APPLICATIONS

This application claims the priority benefit of Japan application serial no. 2013-251432 filed on Dec. 4, 2013, Japanese application serial no. 2013-259691 filed on Dec. 17, 2013, Japanese application serial no. 2014-058613 filed on Mar. 20, 2014, Japanese application serial no. 2014-124849 filed on Jun. 18, 2014, and Japanese application serial no. 2014-206317 filed on Oct. 7, 2014. The entirety of each of the above-mentioned patent applications is hereby incorporated by reference herein and made a part of this specification.

TECHNICAL FIELD

This disclosure relates to a Geiger-Muller counter tube and a radiation measurement apparatus that include a plurality of radiation detecting units.

DESCRIPTION OF THE RELATED ART

A Geiger-Muller counter tube (GM counter tube) is a component that is mainly used in a radiation measurement apparatus. The GM counter tube includes electrodes formed as an anode and a cathode. In the GM counter tube, inert gas is enclosed. Additionally, between the anode electrode and the cathode electrode of the GM counter tube, a high voltage is applied in use. The radiation that enters into the inside of the GM counter tube ionizes the inert gas into an electron and an ion. The ionized electron and ion are accelerated toward the respective anode electrode and cathode electrode. This causes electrical conduction between the anode electrode and the cathode electrode so as to generate a pulse signal. For example, Japanese Unexamined Patent Application Publication No. 59-5983 (hereinafter referred to as Patent Literature 1) discloses a proportional counter where a pair of anode electrode and cathode electrode is formed.

However, in Patent Literature 1, in individual measurement of β-ray and γ-ray, there are some cases where measurement is inconvenient or not possible to perform accurately.

There is a method to perform individual measurement of β-ray and γ-ray as follows: two GM counter tubes are prepared, and then, one GM counter tube is put into a tube such as an aluminum tube to block β-ray and measures only γ-ray, and the other GM counter tube measures β-ray and γ-ray. Thus β-ray is obtained by subtracting the radiation dose of the one GM counter tube from the radiation dose of the other GM counter tube. Additionally, for another method, firstly, perform measurement with a GM counter tube put into a tube such as an aluminum tube, and then, perform measurement again with the GM counter tube removed from the aluminum tube.

In the former method, it is required to prepare two GM counter tubes, which is inconvenient. In addition, when measurement of the radiation is performed by comparing the values of each GM counter tube, there is a problem that accuracy of the derived detected values is lowered due to the variation of the characteristics of each GM counter tube. In the latter method, because measurement of β-ray and γ-ray cannot be performed simultaneously, an accurate comparison between β-ray and γ-ray cannot be performed. Thus, there is a problem that detection sensitivity for β-ray is lowered.

A need thus exists for a GM counter tube and a radiation measurement apparatus which are not susceptible to the drawback mentioned above.

SUMMARY

A Geiger-Muller counter tube according to the disclosure includes a cylindrical enclosing tube, an anode electrode, a cylindrical cathode electrode, an inert gas, and a quenching gas. The cylindrical enclosing tube has a sealed space. The anode electrode is disposed inside the space and formed in a rod shape. The cylindrical cathode electrode surrounds a peripheral area of the anode electrode inside the space to have an opening. The inert gas and the quenching gas are sealed inside the space. At least one of the anode electrode and the cathode electrode includes a plurality of electrodes inside the enclosing tube.

BRIEF DESCRIPTION OF THE DRAWINGS

The foregoing and additional features and characteristics of this disclosure will become more apparent from the following detailed description considered with reference to the accompanying drawings.

FIG. 4B is a schematic cross-sectional view of a Geiger-Muller counter tube 310a.

FIG. 5B is a schematic cross-sectional view of a Geiger-Muller counter tube 410a.

DETAILED DESCRIPTION

The embodiments of this disclosure will be described in detail below with reference to the attached drawings. It will be understood that the scope of the disclosure is not limited to the described embodiments, unless otherwise stated.

[Configuration of Geiger-Muller Counter Tube 110 of First Embodiment]

Figure 1A:
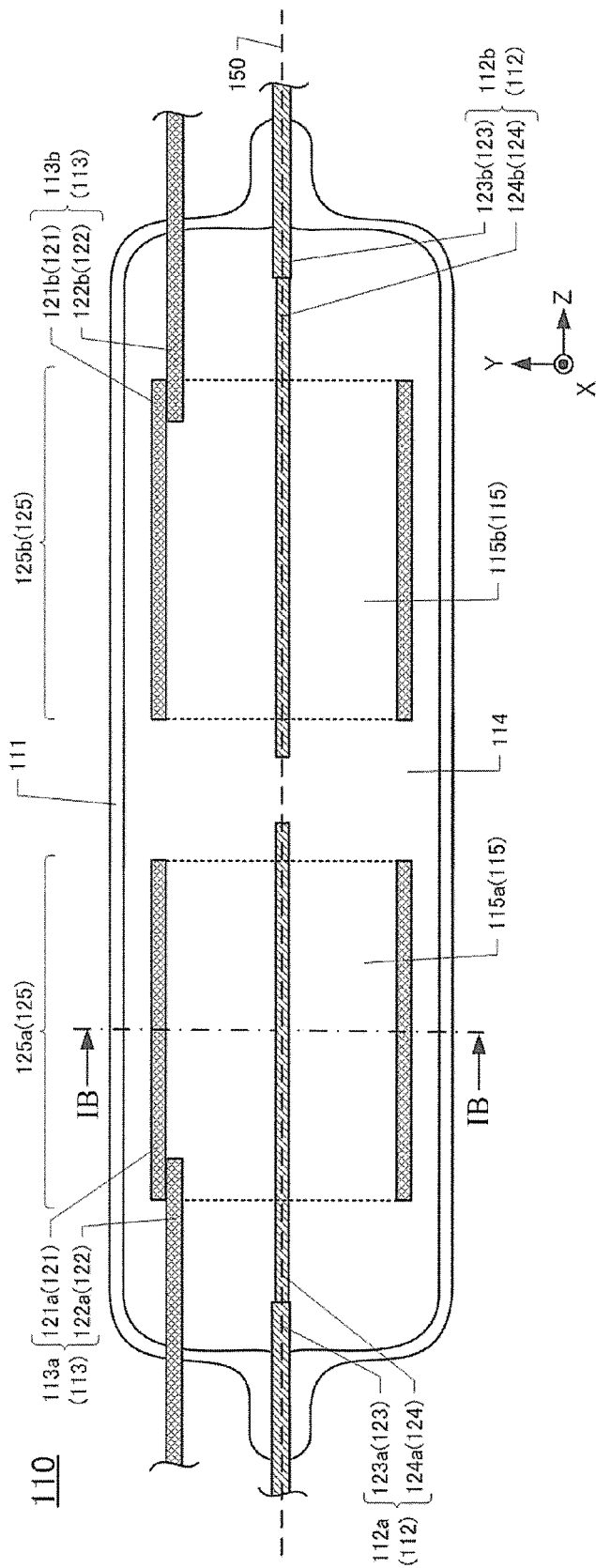
FIG. 1A is a cross-sectional view of a Geiger-Muller counter tube 110.

FIG. 1A is a cross-sectional view of the Geiger-Muller counter tube 110. The Geiger-Muller counter tube 110 is constituted of an enclosing tube 111, an anode conductor 112, and a cathode conductor 113. In the following description, assume that the extending direction of the enclosing tube 111 is the Z-axis direction, the diametrical direction of the enclosing tube 111 which is perpendicular to the Z-axis direction is the X-axis direction. Similarly, assume that the diametrical direction of the enclosing tube 111 which is perpendicular to the X-axis direction and the Z-axis direction is the Y-axis direction.

The enclosing tube 111 is formed of glass in a cylindrical shape. Both ends of the +Z-axis side and the −Z-axis side of the enclosing tube 111 are sealed, and a space 114 inside the enclosing tube 111 is sealed. The anode conductor 112 and the cathode conductor 113 pass through both ends of the +Z-axis side and −Z-axis side of the enclosing tube 111.

The anode conductor 112 is constituted of an anode electrode 124 and a linear first metal lead portion 123. The anode electrode 124 which is rod-shaped is disposed in the space 114. The first metal lead portion 123 is connected to the anode electrode 124 and supported at the end of the enclosing tube 111. In the Geiger-Muller counter tube 110, the anode conductor 112 is constituted of a first anode conductor 112a and a second anode conductor 112b. The first anode conductor 112a is disposed in the −Z-axis side in the space 114, and the second anode conductor 112b is disposed in the +Z-axis side in the space 114. Further, the first anode conductor 112a is constituted of an anode electrode 124a and a first metal lead portion 123a, and the second anode conductor 112b is constituted of an anode electrode 124b and a first metal lead portion 123b. The first metal lead portion 123a is supported at the end of the −Z-axis side of the enclosing tube 111 and the first metal lead portion 123b is supported at the end of the +Z-axis side of the enclosing tube 111. Additionally, in the Geiger-Muller counter tube 110, the anode electrode 124a and the anode electrode 124b are disposed on a straight line 150 which extends in the Z-axis direction.

The cathode conductor 113 is constituted of a cylindrical cathode electrode 121 and a linear second metal lead portion 122. The cathode electrode 121 surrounds the peripheral area of the anode electrode 124 in the space 114. The second metal lead portion 122 is connected to the cathode electrode 121 and is supported at the end of the enclosing tube 111. In the Geiger-Muller counter tube 110, the cathode conductor 113 is constituted of a first cathode conductor 113a and a second cathode conductor 113b. The first cathode conductor 113a is disposed in the −Z-axis side in the space 114, and the second cathode conductor 113b is disposed in the +Z-axis side in the space 114. Further, the first cathode conductor 113a is constituted of a cathode electrode 121a and a second metal lead portion 122a, and the second cathode conductor 113b is constituted of a cathode electrode 121b and a second metal lead portion 122b. The second metal lead portion 122a is supported at the end of the −Z-axis side of the enclosing tube 111, and the second metal lead portion 122b is supported at the end of the +Z-axis side of the enclosing tube 111.

The anode electrode 124 and the cathode electrode 121 which surrounds the anode electrode 124 constitute a radiation detecting unit 125 which detects the radiation. In FIG. 1A, the radiation detecting unit 125 constituted of the anode electrode 124a and the cathode electrode 121a denotes a first radiation detecting unit 125a, and the radiation detecting unit 125 constituted of the anode electrode 124b and the cathode electrode 121b denotes a second radiation detecting unit 125b. In the Geiger-Muller counter tube 110, the radiation is detected at the first radiation detecting unit 125a and the second radiation detecting unit 125b respectively.

The radiation detecting unit 125 has a space 115 which is the space to detect the radiation. The space 115 is the space which is surrounded by the cathode electrode 121 and is the region which includes both of the anode electrode 124 and the cathode electrode 121 inside a XY plane inside the space. In FIG. 1A, the space 115 of the first radiation detecting unit 125a denotes a space 115a, and the space 115 of the second radiation detecting unit 125b denotes a space 115b.

Figure 1B:
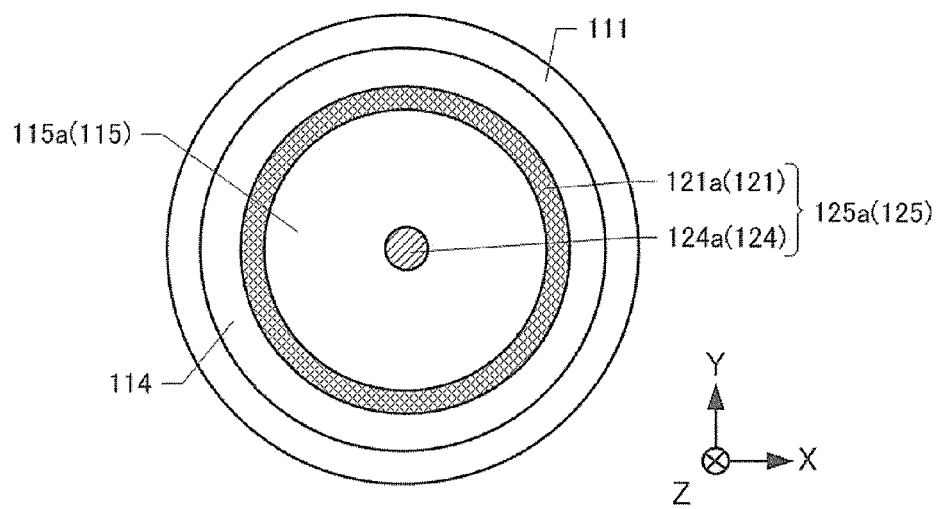
FIG. 1B is a cross-sectional view taken along the line IB-IB of FIG. 1A.

FIG. 1B is a cross-sectional view taken along the line IB-IB of FIG. 1A. The cathode electrode 121 is constituted of a cylindrical metal pipe. The metal pipe is formed of, for example, metallic Kovar that is an alloy of iron, nickel, and cobalt or stainless steel. The anode electrode 124 is disposed on the central axis of the cathode electrode 121. That is, the central axis of the cathode electrode 121 is disposed on the straight line 150. Accordingly, when a voltage is applied between the cathode electrode 121 and the anode electrode 124, inside the XY plane, the electric field of the space 115 surrounded by the cathode electrode 121 is formed with rotational symmetry around the anode electrode 124. In addition, in the space 114 which has the space 115, an inert gas and a quenching gas are enclosed. The inert gas employs, for example, noble gas such as helium (He), neon (Ne), or argon (Ar). In addition, the quenching gas employs, for example, halogen-based gas such as fluorine (F), bromine (Br) or chlorine (Cl).

In the Geiger-Muller counter tube 110, when the radiation enters into the space 115 via the enclosing tube 111, the radiation ionizes the inert gas into a positively charged ion and a negatively charged electron. Further, applying a voltage, for example, from 400V to 600V between the anode electrode 124 and the cathode electrode 121 forms an electric field within the space 115. Accordingly, the ionized ion and electron are accelerated toward the respective cathode electrode 121 and anode electrode 124. The accelerated ions collide with another inert gas so as to ionize the other inert gas. This repetition of ionizations forms ionized ions and electrons like the avalanche in the space 115, thus causing a flow of a pulse current. A radiation measurement apparatus 100 (see FIG. 2) with the Geiger-Muller counter tube 110 can measure the number of pulses of a pulse signal due to this pulse current so as to measure the radiation dose. Additionally, when this current continuously flows, the number of pulses cannot be measured. In order to prevent this situation, the quenching gas is enclosed within the space 114 together with the inert gas. The quenching gas has an action for dispersing the energy of the ion.

In the Geiger-Muller counter tube, the radiation which enters into the space 115 is measured, and thus, the detection sensitivity for the radiation can be increased by forming the space 115 larger. However, when the space 115 is formed larger by lengthening the anode electrode 124 and the cathode electrode 121, the fixed strength of the anode electrode 124 and the cathode electrode 121 in the space 115 is weakened. Therefore, the Geiger-Muller counter tube becomes susceptible to impact.

In the Geiger-Muller counter tube 110, the size of the space 115 is formed larger by forming the two sets of the respective pairs of anode electrodes 124 and cathode electrodes 121 in the space 114. Further, each anode electrode 124 and cathode electrode 121 is secured at the −Z-axis side or the +Z-axis side of the Geiger-Muller counter tube 110. Therefore, the fixed strength of the anode electrode 124 and the cathode electrode 121 in the space 114 is increased. Thus, the impact resistance of the Geiger-Muller counter tube 110 is improved.

Figure 1C:
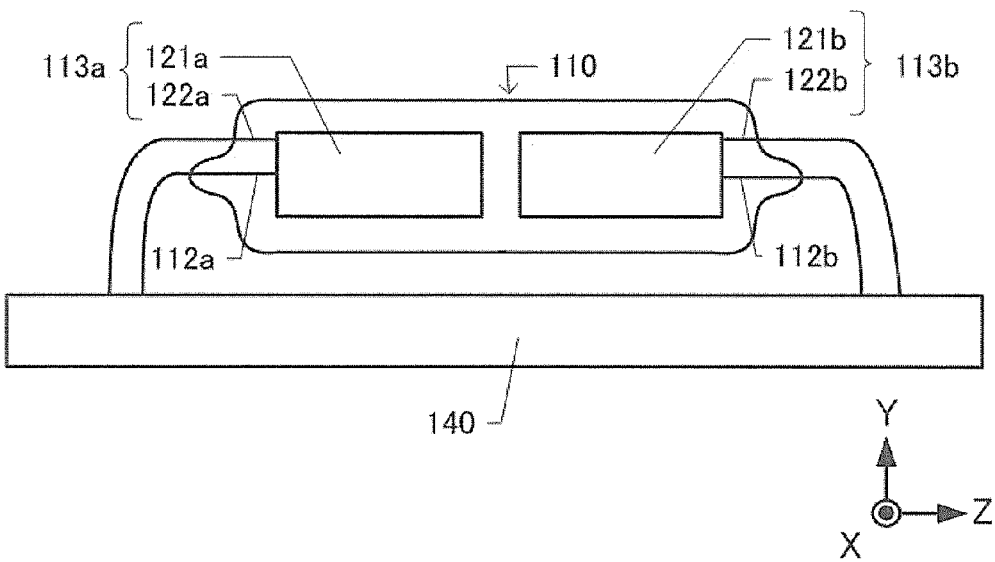
FIG. 1C is a schematic side view of the Geiger-Muller counter tube 110 mounted on a substrate.

FIG. 1C is a schematic side view of the Geiger-Muller counter tube 110 mounted on a substrate 140. The Geiger-Muller counter tube 110 is used by being fixed to the substrate 140. In the conventional Geiger-Muller counter tube, electrodes are extracted only from one end of the enclosing tube, and only one end of the Geiger-Muller counter tube is secured to the substrate or a similar part. In contrast to this, in the Geiger-Muller counter tube 110, the electrodes are extracted from both ends of the enclosing tube 111. As illustrated in FIG. 1C, the Geiger-Muller counter tube 110 is secured to the substrate 140 at both ends of the +Z-axis side and the −Z-axis side of the Geiger-Muller counter tube 110. Therefore, the Geiger-Muller counter tube 110 can firmly and stably be secured to the substrate or a similar part compared to the conventional Geiger-Muller counter tubes.

In addition, in the Geiger-Muller counter tube 110, the measurement is performed in the state where the inert gas and the quenching gas are sealed in the space 114 and are not circulated. Therefore, the state in the space 114 is stabilized, and the detection sensitivity of the radiations can be kept stable.

Furthermore, when using a plurality of Geiger-Muller counter tubes for the purpose such as increasing the detection sensitivity for the radiation, due to the individual difference of the detection sensitivity of each Geiger-Muller counter tubes, the accuracy of radiation detection may be lowered in some cases. In the Geiger-Muller counter tube 110, two sets of the radiation detecting unit 125 are disposed in one Geiger-Muller counter tube, and the inert gas and the quenching gas are commonly used. Accordingly, the ratio of the inert gas and the quenching gas inside the Geiger-Muller counter tube 110 is the same. Therefore, in the Geiger-Muller counter tube 110, the accuracy of radiation detection can be increased compared to using two sets of the Geiger-Muller counter tubes.

[Configuration of Radiation Measurement Apparatus 100]

Figure 2:
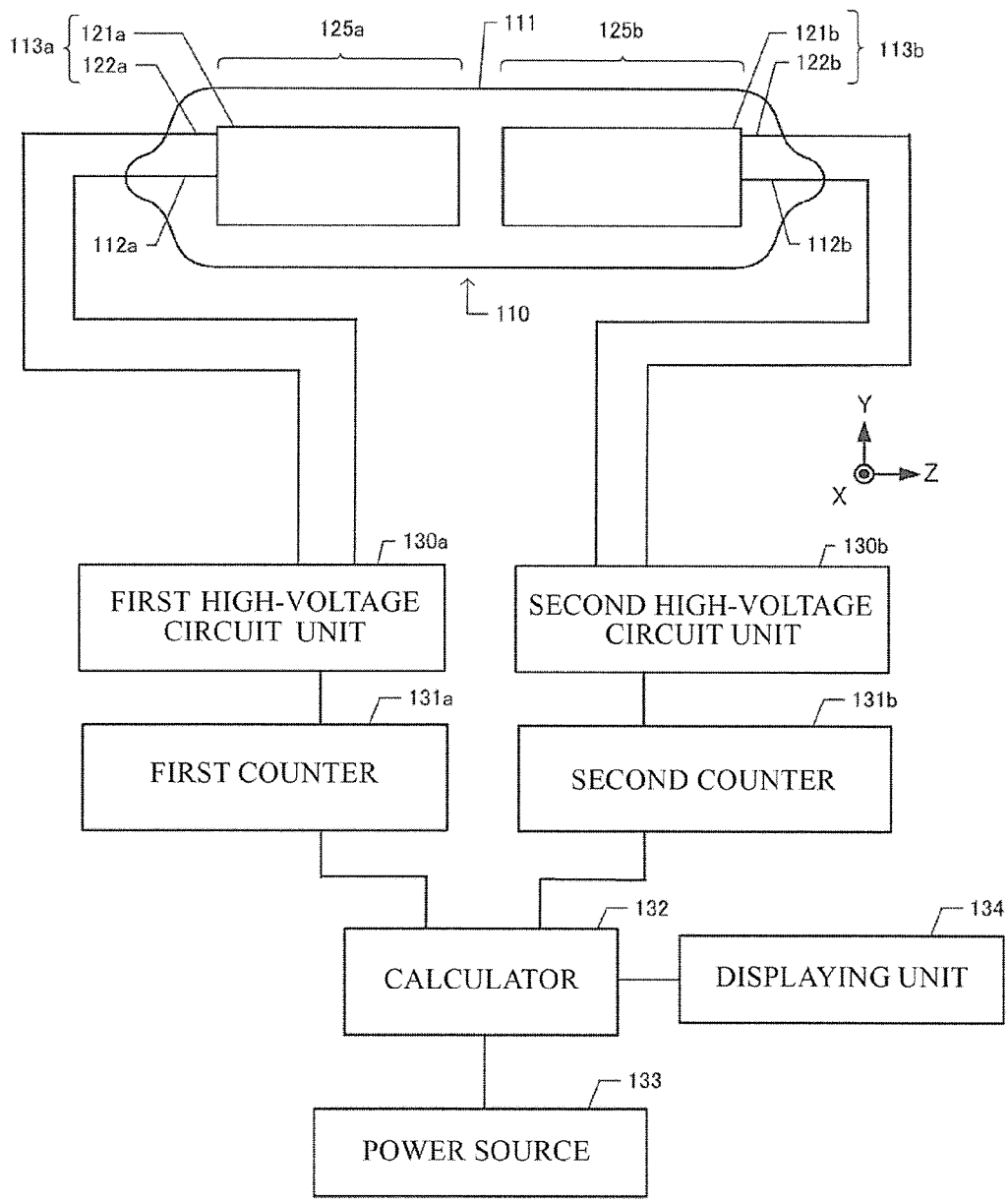
FIG. 2 is a schematic configuration diagram of a radiation measurement apparatus 100.

FIG. 2 is a schematic configuration diagram of the radiation measurement apparatus 100. The radiation measurement apparatus 100 is constituted including the Geiger-Muller counter tube 110. The first anode conductor 112a and the first cathode conductor 113a are connected to a first high-voltage circuit unit 130a, and a high voltage is applied between both conductors. Further, the second anode conductor 112b and the second cathode conductor 113b are connected to a second high-voltage circuit unit 130b, and a high voltage is applied between both conductors. The first high-voltage circuit unit 130a is connected to a first counter 131a and the second high-voltage circuit unit 130b is connected to a second counter 131b. The pulse signal detected by the first radiation detecting unit 125a and the second radiation detecting unit 125b of the Geiger-Muller counter tube 110 is counted by the first counter 131a and the second counter 131b and then converted into the radiation dose by a calculator 132. The converted radiation dose is displayed on a displaying unit 134. The calculator 132 connects to a power source 133 to receive the electric power.

In FIG. 2, the first radiation detecting unit 125a and the second radiation detecting unit 125b are respectively connected to the different high-voltage circuit unit and counter. Thus, the first radiation detecting unit 125a and the second radiation detecting unit 125b detect the radiation dose individually. However, the first radiation detecting unit 125a and the second radiation detecting unit 125b may be connected in parallel to one high-voltage circuit unit and one counter. Thus, the first radiation detecting unit 125a and the second radiation detecting unit 125b may detect the radiation dose as a whole.

[Second Embodiment]

The radiation dose detected by the Geiger-Muller counter tube 110 is measured as the total value of the radiation dose of both β-ray and γ-ray. On the other hand, it is required to measure each radiation dose of β-ray and γ-ray in some cases. The following description describes a Geiger-Muller counter tube 210 and a radiation measurement apparatus 200 to measure each radiation dose of β-ray and γ-ray. Additionally, like reference numerals designate corresponding or identical elements throughout the first embodiment, and therefore such elements will not be further elaborated here

[Configuration of Geiger-Muller Counter Tube 210]

Figure 3A:
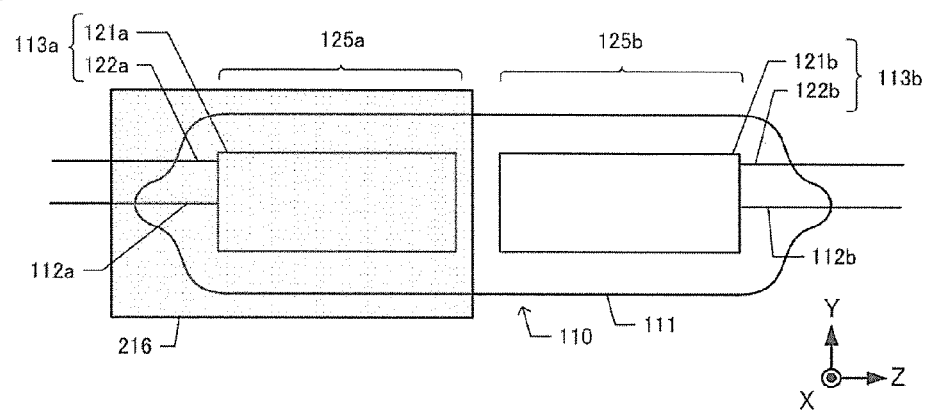
FIG. 3A is a schematic configuration diagram of a Geiger-Muller counter tube 210.

FIG. 3A is a schematic configuration diagram of the Geiger-Muller counter tube 210. The Geiger-Muller counter tube 210 is formed in the state where a shielding portion 216 is mounted to the first radiation detecting unit 125a of the Geiger-Muller counter tube 110. The shielding portion 216 blocks β-ray by surrounding the enclosing tube 111 from the outside. The shielding portion 216 can be, for example, formed as a cylindrical tube of aluminum.

In the Geiger-Muller counter tube 210, the second radiation detecting unit 125b, which is not covered by the shielding portion 216, can detect β-ray and γ-ray. In addition, the first radiation detecting unit 125a, which is covered with the shielding portion 216, can detect only γ-ray because β-ray is blocked by the shielding portion 216. The radiation dose of β-ray can be obtained by subtracting the radiation dose of the first radiation detecting unit 125a from the radiation dose of the second radiation detecting unit 125b.

Conventionally, two Geiger-Muller counter tubes are prepared when measuring β-ray and γ-ray simultaneously. One Geiger-Muller counter tube is put into a tube such as an aluminum tube to block β-ray and measures only γ-ray. In addition, the other Geiger-Muller counter tube measures β-ray and γ-ray. Then, β-ray is obtained by subtracting the radiation dose of the one Geiger-Muller counter tube from the radiation dose of the other Geiger-Muller counter tube.

In contrast to this, in the Geiger-Muller counter tube 210, both the radiation doses of β-ray and γ-ray can be measured simultaneously with one Geiger-Muller counter tube. Therefore, it is possible to save a labor to prepare a plurality of Geiger-Muller counter tubes and thus, the measurement is facilitated. Furthermore, similar to the Geiger-Muller counter tube 110, the inert gas and the quenching gas are commonly used in the first radiation detecting unit 125a and the second radiation detecting unit 125b. Therefore, the accuracy of radiation detection can be increased compared to using two sets of the Geiger-Muller counter tubes.

[Configuration of Radiation Measurement Apparatus 200]

Figure 3B:
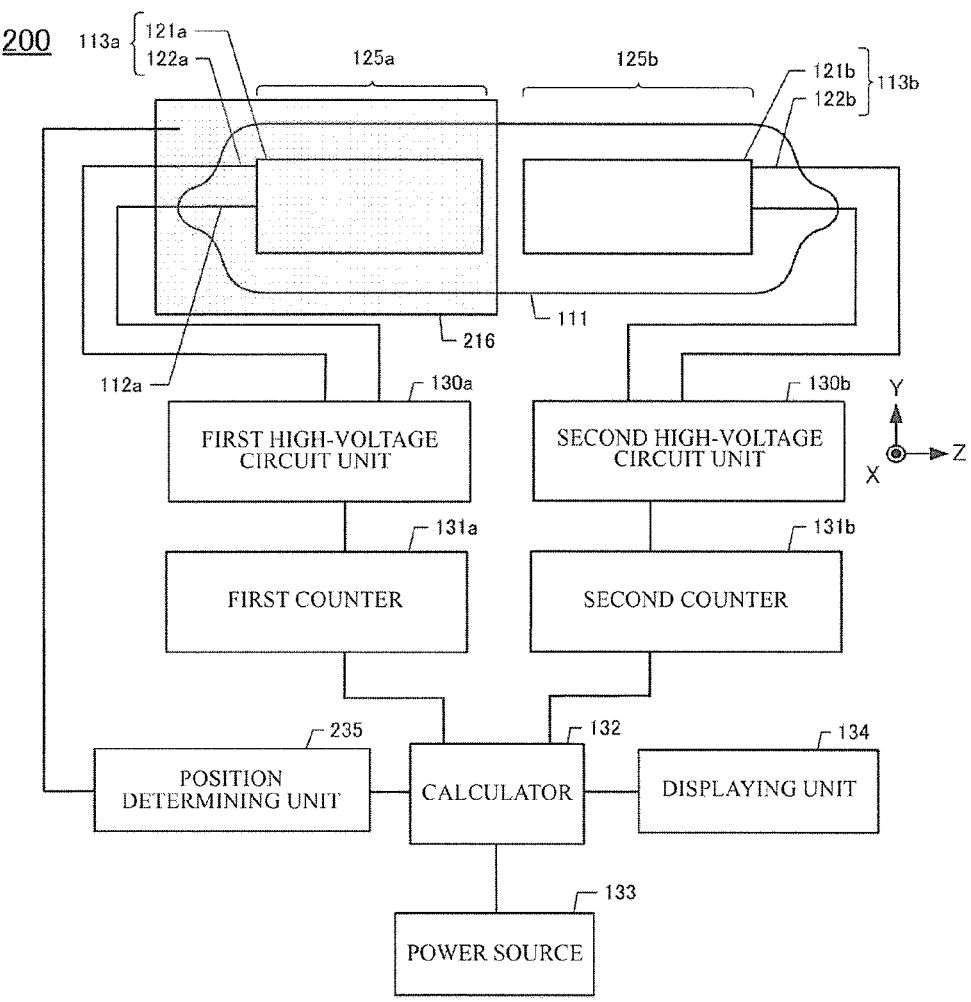
FIG. 3B is a schematic configuration diagram of a radiation measurement apparatus 200.

FIG. 3B is a schematic configuration diagram of the radiation measurement apparatus 200. In the radiation measurement apparatus 200, the Geiger-Muller counter tube 210 is employed instead of the Geiger-Muller counter tube 110 in the radiation measurement apparatus 100 illustrated in FIG. 2. Further, a position determining unit 235 for determining the position of the shielding portion 216 is included. In the state illustrated in FIG. 3B, the radiation dose of only γ-ray is detected at the first counter 131a which is connected to the first radiation detecting unit 125a shielded by the shielding portion 216. Additionally, the radiation dose of γ-ray and β-ray is detected at the second counter 131b which is connected to the second radiation detecting unit 125b Therefore, in the radiation measurement apparatus 200, the radiation dose of γ-ray can be detected by the radiation dose of the first radiation detecting unit 125a. Further, the radiation dose of β-ray can be detected by subtracting the radiation dose of the first radiation detecting unit 125a from the radiation dose of the second radiation detecting unit 125b. These calculations are performed at the calculator 132, and further, the result can be displayed on the displaying unit 134.

In addition, in the radiation measurement apparatus 200, the shielding portion 216 is formed so as to be able to freely remove from and mount to the first radiation detecting unit 125a. For example, when the shielding portion 216 is moved to the −Z-axis direction from the state of FIG. 3B, the first radiation detecting unit 125a becomes exposed. Then, the first radiation detecting unit 125a and the second radiation detecting unit 125b can perform measurement in the same condition. When the measurement is performed in this state, it is possible to perform proofread of the detected value of the radiation dose between the first radiation detecting unit 125a and the second radiation detecting unit 125b or similar operation.

Furthermore, in the shielding portion 216, for example, a sensor (not illustrated), which senses whether the shielding portion 216 is removed from or mounted to the Geiger-Muller counter tube 210, may be included. Thus, removal/mounting of the shielding portion 216 may be determined automatically. The sensor is connected to the position determining unit 235 which determines the position of the shielding portion 216, and the position determining unit 235 is connected to the calculator 132. In the calculator 132, when the position determining unit 235 determines that the shielding portion 216 is mounted to the Geiger-Muller counter tube 210, γ-ray is detected by the first radiation detecting unit 125a. Then, β-ray is automatically detected by subtracting the radiation dose of the first radiation detecting unit 125a from that of the second radiation detecting unit 125b. Furthermore, when the position determining unit 235 determines that the shielding portion 216 is removed from the Geiger-Muller counter tube 210, the radiation doses of the first radiation detecting unit 125a and the second radiation detecting unit 125b are displayed on the displaying unit 134. In the display on the displaying unit 134, an arithmetic mean of the radiation doses of the first radiation detecting unit 125a and the second radiation detecting unit 125b may be displayed.

[Third Embodiment]

In the Geiger-Muller counter tube, only either one of the cathode conductor or the anode conductor may be formed in two sets. The following description describes the Geiger-Muller counter tube where only either one of the cathode conductor or the anode conductor is formed in two sets. Additionally, like reference numerals designate corresponding or identical elements throughout the first embodiment and the second embodiment, and therefore such elements will not be further elaborated here.

[Configuration of Geiger-Muller Counter Tube 310]

Figure 4A:
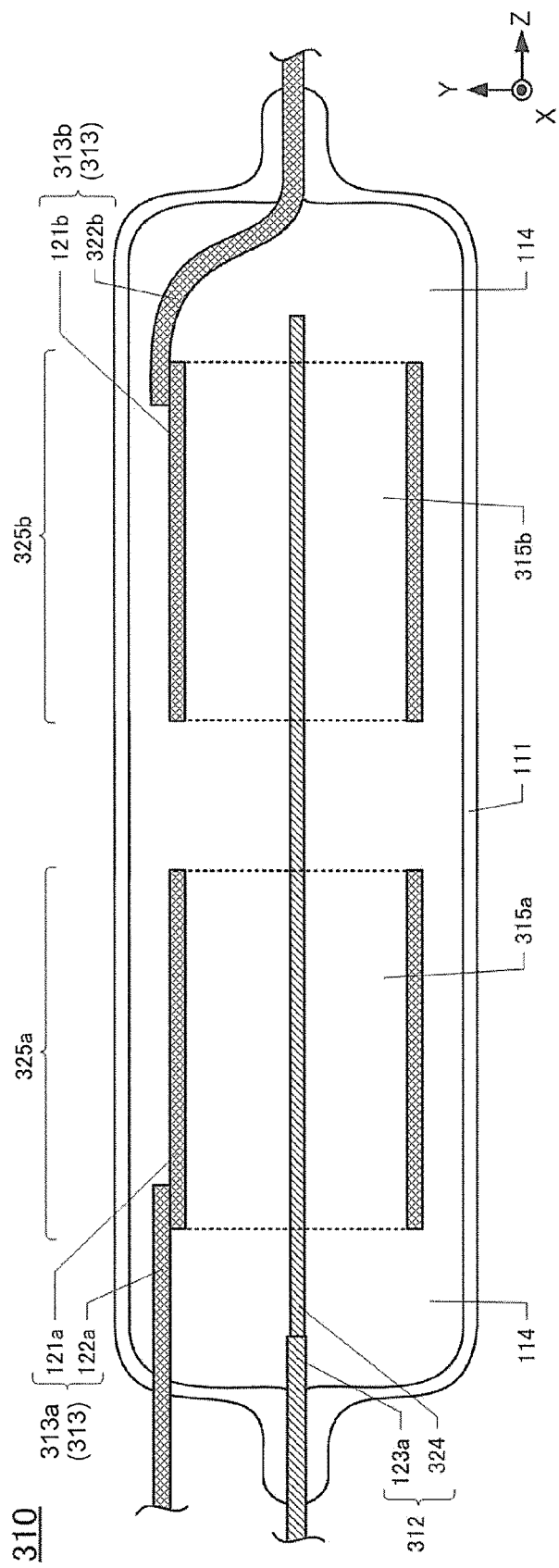
FIG. 4A is a cross-sectional view of a Geiger-Muller counter tube 310.

FIG. 4A is a cross-sectional view of the Geiger-Muller counter tube 310. The Geiger-Muller counter tube 310 is constituted of the enclosing tube 111, an anode conductor 312, and a cathode conductor 313.

The anode conductor 312 is constituted of an anode electrode 324 and the linear first metal lead portion 123a. The anode electrode 324 is disposed in the space 114. The first metal lead portion 123a is connected to the anode electrode 324 and supported at the end of the −Z-axis side the enclosing tube 111. The end of the −Z-axis side of the anode electrode 324 is connected to the first metal lead portion 123a. The end of the +Z-axis side of the anode electrode 324 extends in the Z-axis direction up to near the end of the +Z-axis side in the space 114.

The cathode conductor 313 is constituted of a first cathode conductor 313a which is disposed in the −Z-axis side in the space 114 and a second cathode conductor 313b which is disposed in the +Z-axis side in the space 114. The first cathode conductor 313a is constituted of the cathode electrode 121a and the second metal lead portion 122a, and the second metal lead portion 122a is bonded on the outer surface of the cathode electrode 121a. The second cathode conductor 313b is constituted of the cathode electrode 121b and a second metal lead portion 322b, and the second metal lead portion 322b is bonded on the outer surface of the cathode electrode 121b. Further, the second metal lead portion 322b is supported at the center of the end of the +Z-axis side of the enclosing tube 111.

In the Geiger-Muller counter tube 310, the cathode electrode 121a and the anode electrode 324 constitute a first radiation detecting unit 325a, and the cathode electrode 121b and the anode electrode 324 constitute a second radiation detecting unit 325b. The first radiation detecting unit 325a has a space 315a which detects the radiation and the second radiation detecting unit 325b has a space 315b which detects the radiation.

In the anode electrode 324, the ionized electrons, which are generated at the first radiation detecting unit 325a and the second radiation detecting unit 325b, are detected. Accordingly, by measuring the pulse signals detected at the anode electrode 324, the total radiation dose of β-ray and γ-ray, which are detected at the first radiation detecting unit 325a and the second radiation detecting unit 325b, can be measured.

In each radiation detecting unit, the ionized ions receive the electrons in the cathode electrode 121, and the pulse current flows to the cathode electrode 121. The radiation dose can be measured by measuring this pulse current. In the cathode electrode 121a and the cathode electrode 121b, the respective total radiation doses of β-ray and γ-ray is measured at the first radiation detecting unit 325a and the second radiation detecting unit 325b.

In the Geiger-Muller counter tube 310, the whole radiation dose of the first radiation detecting unit 325a and the second radiation detecting unit 325b is measured by the anode electrode 324. Further, at the same time, the radiation dose of the first radiation detecting unit 325a and the second radiation detecting unit 325b can be individually measured by each cathode electrode. Additionally, in the Geiger-Muller counter tube 310, despite the capability of performing such individual measurement, assembly of the Geiger-Muller counter tube 310 is facilitated because the usage of the anode electrode 324 is one.

Further, in the cathode conductor 313, the second metal lead portion 122a and the second metal lead portion 322b are bonded on the outer surfaces of the cathode electrode 121a and the cathode electrode 121b respectively. Therefore, the gap between the anode electrode and the cathode electrode is constant at any position in the space 315a and the space 315b where the radiation is detected. Accordingly, unevenness of the discharge conditions in the space 315a and the space 315b is eliminated, and more accurate measurement can be performed. In addition, the configuration such as bonding the metal lead portion on the outer surface of the cathode electrode may be employed to the aforementioned Geiger-Muller counter tube 110 and the Geiger-Muller counter tube 410 described below or similar Geiger-Muller counter tubes.

[Configuration of Geiger-Muller Counter Tube 310a]

Figure 4B:
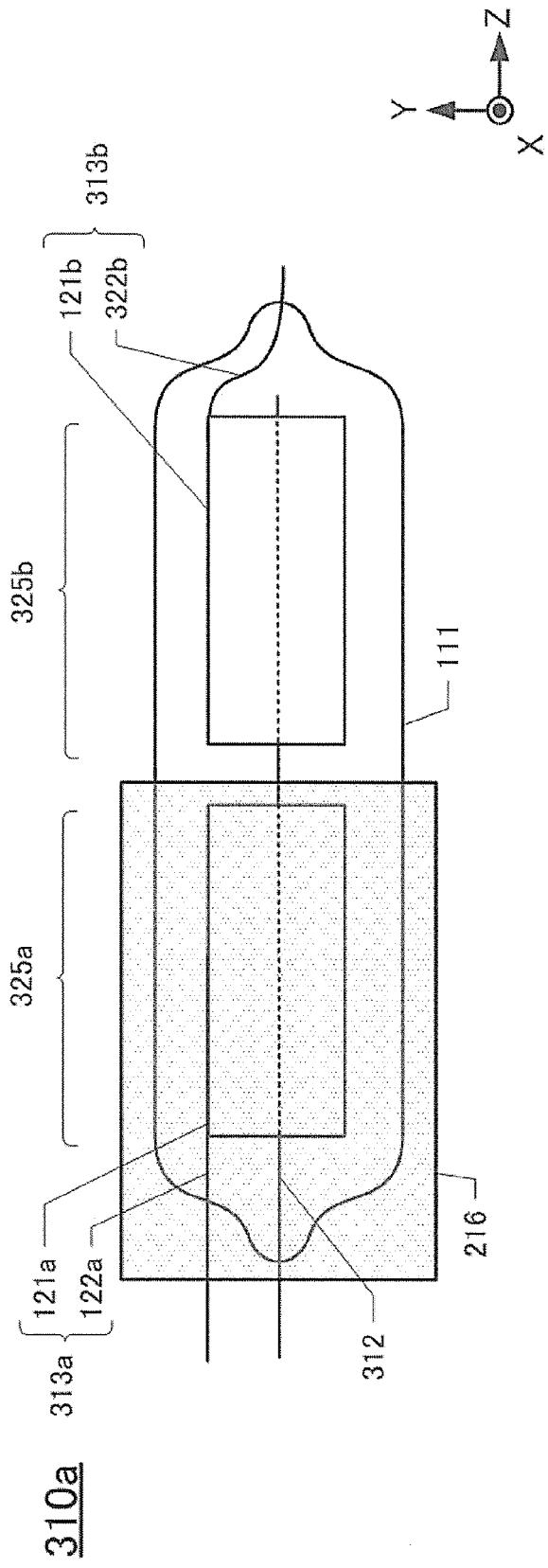

FIG. 4B is a schematic cross-sectional view of the Geiger-Muller counter tube 310a. The Geiger-Muller counter tube 310a is constituted of the Geiger-Muller counter tube 310 and the shielding portion 216 which covers the first radiation detecting unit 325a of the Geiger-Muller counter tube 310.

In the first radiation detecting unit 325a, only γ-ray is detected. Therefore, the radiation dose of γ-ray can be detected by measuring the pulse signal observed at the cathode electrode 121a. Additionally, the radiation dose of β-ray can be measured by subtracting the radiation dose detected at the cathode electrode 121a from the radiation dose detected at the cathode electrode 121b.

Furthermore, with the use of the Geiger-Muller counter tube 310a, similar to the radiation measurement apparatus 200 illustrated in FIG. 3B, a radiation measurement apparatus where removal/mounting of the shielding portion 216 can be freely performed can be formed.

[Configuration of Geiger-Muller Counter Tube 410]

Figure 5A:
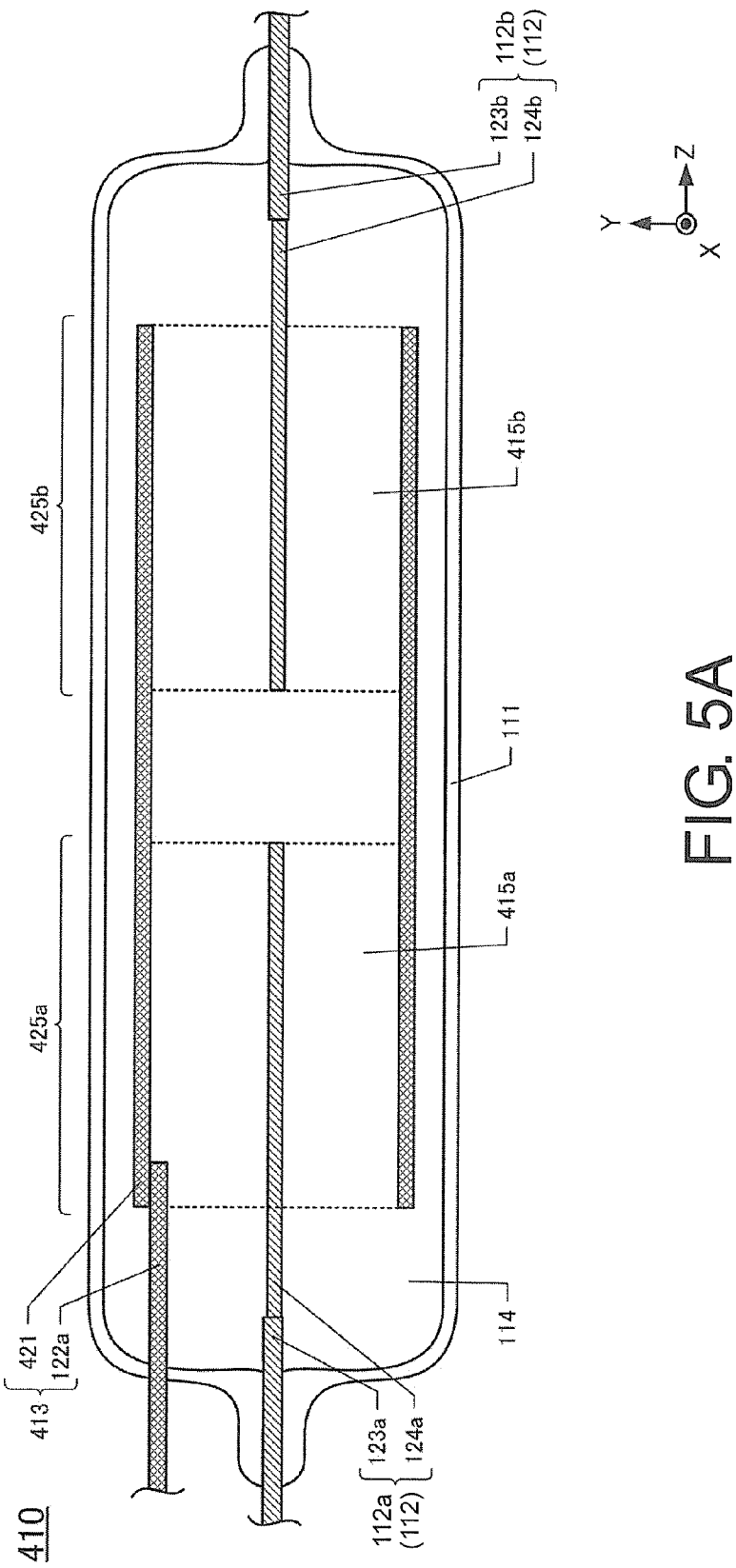
FIG. 5A is a cross-sectional view of a Geiger-Muller counter tube 410.

FIG. 5A is a cross-sectional view of the Geiger-Muller counter tube 410. The Geiger-Muller counter tube 410 is constituted of the enclosing tube 111, the anode conductor 112, and a cathode conductor 413.

The cathode conductor 413 is constituted of a cathode electrode 421 and the second metal lead portion 122a. The second metal lead portion 122a passes through the end of the −Z-axis side of the enclosing tube 111 and holds the cathode electrode 421. The cathode electrode 421 is disposed so as to extend in the Z-axis direction in the space 114. The cathode electrode 421 extends from near the end of the −Z-axis side to near the end of the +Z-axis side in the space 114.

The anode conductor 112 is constituted of the first anode conductor 112a and the second anode conductor 112b, similar to the Geiger-Muller counter tube 110 illustrated in FIG. 1A. Both the anode electrode 124a of the first anode conductor 112a and the anode electrode 124b of the second anode conductor 112b are disposed on the central axis of the cathode electrode 421.

In the Geiger-Muller counter tube 410, assume that the portion where the cathode electrode 421 and the anode electrode 124a are overlapped in the XY plane is a first radiation detecting unit 425a. Further, assume that the portion where the cathode electrode 421 and the anode electrode 124b are overlapped in the XY plane is a second radiation detecting unit 425b. In addition, assume that the space where the first radiation detecting unit 425a detects the radiation is a space 415a and the space where the second radiation detecting unit 425b detects the radiation is a space 415b.

In the Geiger-Muller counter tube 410, the total radiation dose of the first radiation detecting unit 425a and the second radiation detecting unit 425b is detected by the cathode electrode 421. Additionally, the total radiation dose of β-ray and γ-ray at the first radiation detecting unit 425a can be detected by the anode electrode 124a, and the total radiation dose of β-ray and γ-ray at the second radiation detecting unit 425b can be detected by the anode electrode 124b. Furthermore, in the Geiger-Muller counter tube 410, despite the capability of performing such a plurality of radiation-dose-measurements simultaneously, assembly of the Geiger-Muller counter tube 410 is facilitated because the usage of the cathode electrode 421 is one.

[Configuration of Geiger-Muller Counter Tube 410a]

Figure 5B:
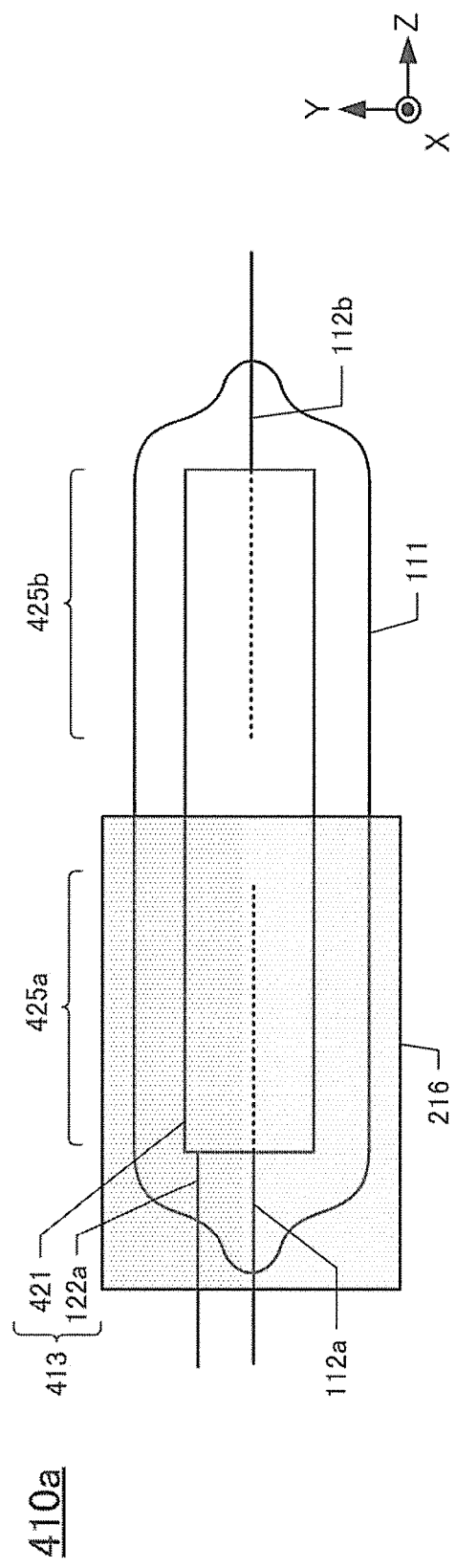

FIG. 5B is a schematic cross-sectional view of the Geiger-Muller counter tube 410a. The Geiger-Muller counter tube 410a is constituted of the Geiger-Muller counter tube 410 and the shielding portion 216 which covers the first radiation detecting unit 425a of the Geiger-Muller counter tube 410.

In the first radiation detecting unit 425a, only γ-ray is detected. Therefore, the radiation dose of γ-ray can be detected by measuring the pulse signal observed at the anode electrode 124a. Additionally, the radiation dose of β-ray can be measured by subtracting the radiation dose detected at the anode electrode 124a from the radiation dose detected at the anode electrode 124b.

Furthermore, with the use of the Geiger-Muller counter tube 410a, a radiation measurement apparatus, where removal/mounting of the shielding portion 216 can be freely performed, can be formed, similar to the radiation measurement apparatus 200 illustrated in FIG. 3B.

[Fourth Embodiment]

In the radiation measurement apparatus 100, the first radiation detecting unit 125a and the second radiation detecting unit 125b are connected to the first high-voltage circuit unit 130a and the second high-voltage circuit unit 130b respectively. However, the first radiation detecting unit 125a and the second radiation detecting unit 125b may be connected together to one single high-voltage circuit unit. The following description describes the radiation measurement apparatus which includes a plurality of radiation measurement units and one single high-voltage circuit unit. Additionally, like reference numerals designate corresponding or identical elements throughout the first, the second, and the third embodiment, and therefore such elements will not be further elaborated here.

[Configuration of Radiation Measurement Apparatus 500]

Figure 6:
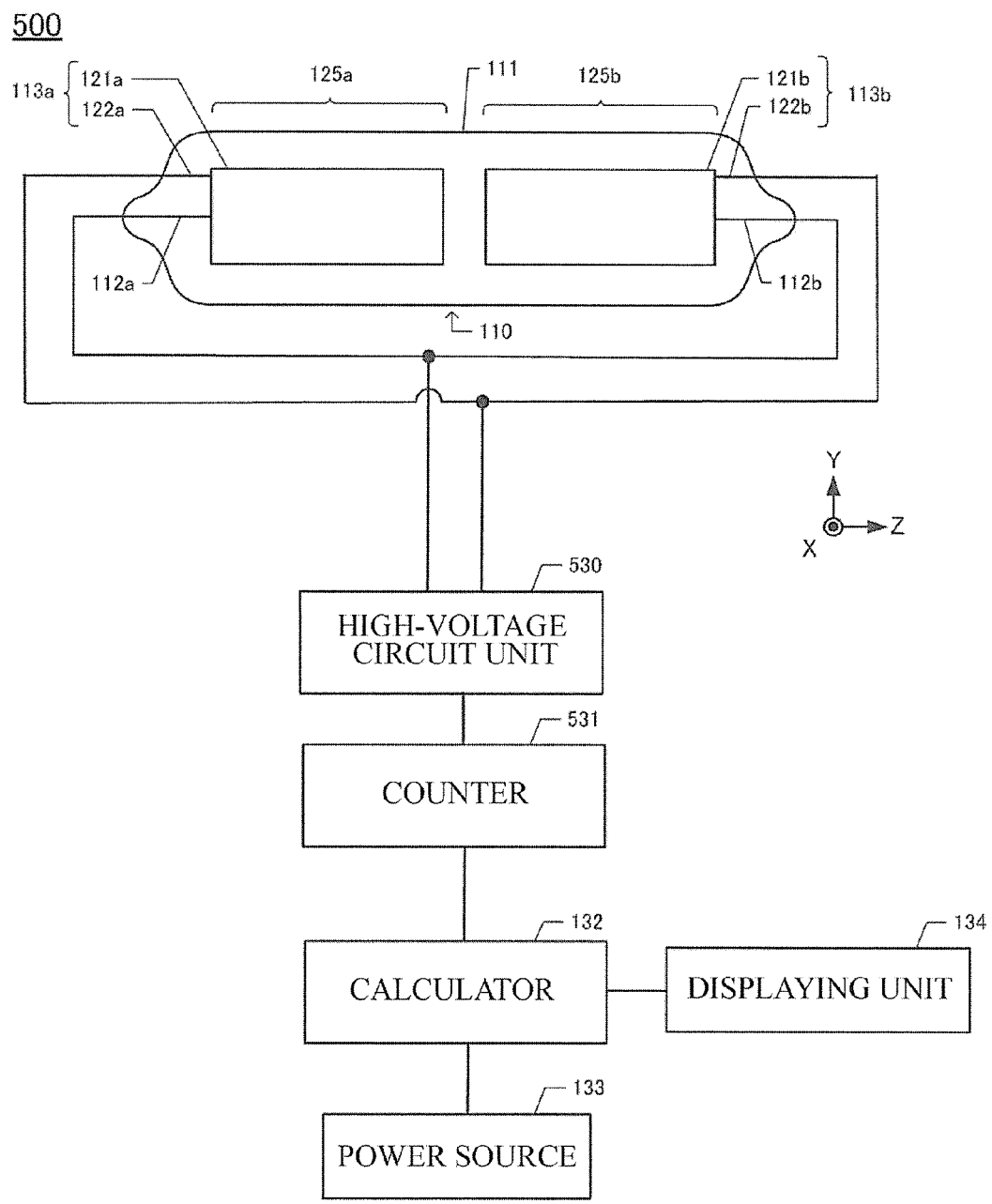
FIG. 6 is a schematic configuration diagram of a radiation measurement apparatus 500.

FIG. 6 is a schematic configuration diagram of the radiation measurement apparatus 500. The radiation measurement apparatus 500 is constituted including the Geiger-Muller counter tube 110, a high-voltage circuit unit 530, a counter 531, the calculator 132, the displaying unit 134, and the power source 133. The high-voltage circuit unit 530 has similar performance with the first high-voltage circuit unit 130a and the second high-voltage circuit unit 130b. The counter 531 has similar performance with the first counter 131a and the second counter 131b.

The first anode conductor 112a and the second anode conductor 112b of the Geiger-Muller counter tube 110 are connected together, and connected to the high-voltage circuit unit 530. In addition, the first cathode conductor 113a and the second cathode conductor 113b are connected together, and connected to the high-voltage circuit unit 530. That is, the first radiation detecting unit 125a and the second radiation detecting unit 125b are connected in parallel with respect to the high-voltage circuit unit 530

The counter 531 is connected to the high-voltage circuit unit 530, and the pulse signals detected by the first radiation detecting unit 125a and the second radiation detecting unit 125b are counted by the counter 531. That is, in the counter 531, the total of the pulse signals detected by the first radiation detecting unit 125a and the second radiation detecting unit 125b is detected. The calculator 132 is connected to the counter 531, and the power source 133 and the displaying unit 134 is connected to the calculator 132.

Figure 7:
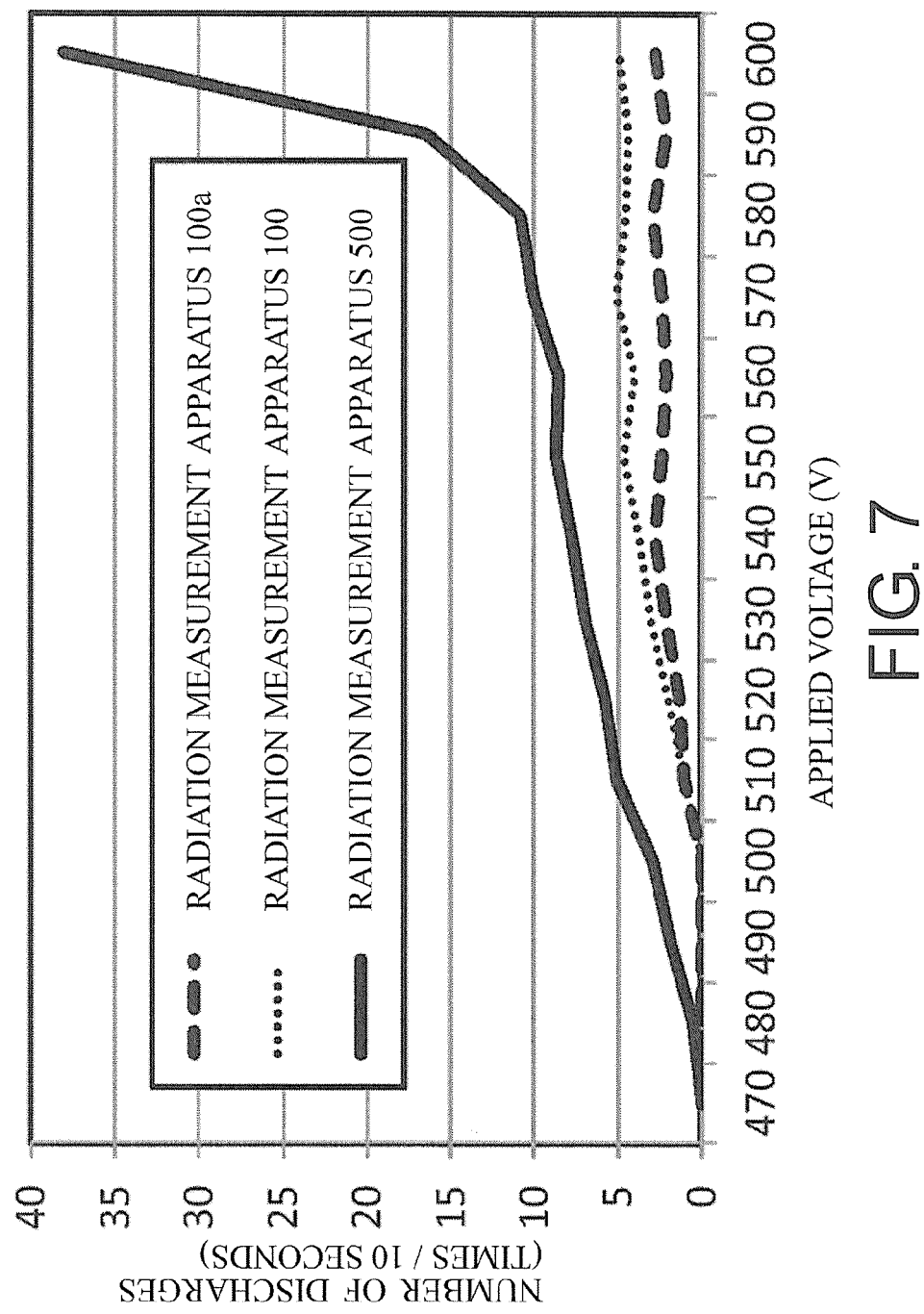
FIG. 7 is a graph that compares the number of discharges of radiation measurement apparatuses.

FIG. 7 is a graph that compares the number of discharges of radiation measurement apparatuses. In FIG. 7, the relationship between the number of discharges of the three radiation measurement apparatuses and applied voltages is illustrated. The three radiation measurement apparatuses are as follows: the radiation measurement apparatus 500 (see FIG. 6), the radiation measurement apparatus 100 (see FIG. 2), and a radiation measurement apparatus 100a. The radiation measurement apparatus 100a is the radiation measurement apparatus where, in the radiation measurement apparatus 100 (see FIG. 2), the electrode of the second radiation detecting unit 125b is opened. Thus, the measurement is performed with only the first radiation detecting unit 125a. The vertical axis of FIG. 7 denotes the number of discharges of the entire Geiger-Muller counter tube of each radiation measurement apparatus. The number of discharges is denoted as the number of discharges per 10 seconds. Further, the horizontal axis of FIG. 7 denotes the magnitude of the applied voltages which are applied between the anode electrode and the cathode electrode of the Geiger-Muller counter tube. The applied voltage is DC voltage, and a unit is volt (V).

In FIG. 7, the number of discharges of the radiation measurement apparatus 100a increases between 500V to 530V in applied voltage and stabilizes when the applied voltage becomes larger than 530V. The number of discharges of the radiation measurement apparatus 100 increases between 500V to 540V in applied voltage and stabilizes when the applied voltage becomes larger than 530V. In the radiation measurement apparatus 500, the number of discharges increases between 480V to 510V in applied voltage. Further, the number of discharges increases gradually between 510V to 580V in applied voltage and increases significantly when the applied voltage becomes larger than 580V.

For the comparison of each radiation measurement apparatus, the number of discharges is compared when the applied voltage is 550V. The results of the number of discharges of each radiation measurement apparatus are as follows, i.e., 2.4 times/10 seconds in the radiation measurement apparatus 100a, 4.7 times/10 seconds in the radiation measurement apparatus 100, 8.7 times/10 seconds in the radiation measurement apparatus 500. In this case, the radiation measurement apparatus 100 detects about two times as many as the pulse signal with respect to the radiation measurement apparatus 100a. Further, the radiation measurement apparatus 500 detects about 1.9 times as many as the pulse signal with respect to the radiation measurement apparatus 100, and about 3.6 times as many as the pulse signal with respect to the radiation measurement apparatus 100a. That is, among the three radiation measurement apparatuses illustrated in FIG. 7, the radiation-detection sensitivity of the radiation measurement apparatus 100a is the lowest and that of the radiation measurement apparatus 500 is the highest.

The main difference between the radiation measurement apparatus 100 and radiation measurement apparatus 500 is the number of usage of the high-voltage circuit unit and the counter. Therefore, the difference of the radiation-detection sensitivity between the radiation measurement apparatus 100 and the radiation measurement apparatus 500 illustrated in FIG. 7 is very likely caused by the number of usage of the high-voltage circuit unit and the counter. Furthermore, because the counter only counts the pulse signal, it is very likely that the number of usage of the high-voltage circuit unit significantly affects the difference of the radiation-detection sensitivity.

As illustrated in the radiation measurement apparatus 500 in FIG. 7, using one single high-voltage circuit unit can increase the radiation-detection sensitivity compared to using a plurality of high-voltage circuit units. Furthermore, in the radiation measurement apparatus 500, the number of usage of the high-voltage circuit unit and the counter is only one respectively. Thus, the number of components for the radiation measurement apparatus becomes fewer, and manufacturing cost is lowered, which is preferred.

[Configuration of Radiation Measurement Apparatus 600]

Figure 8:
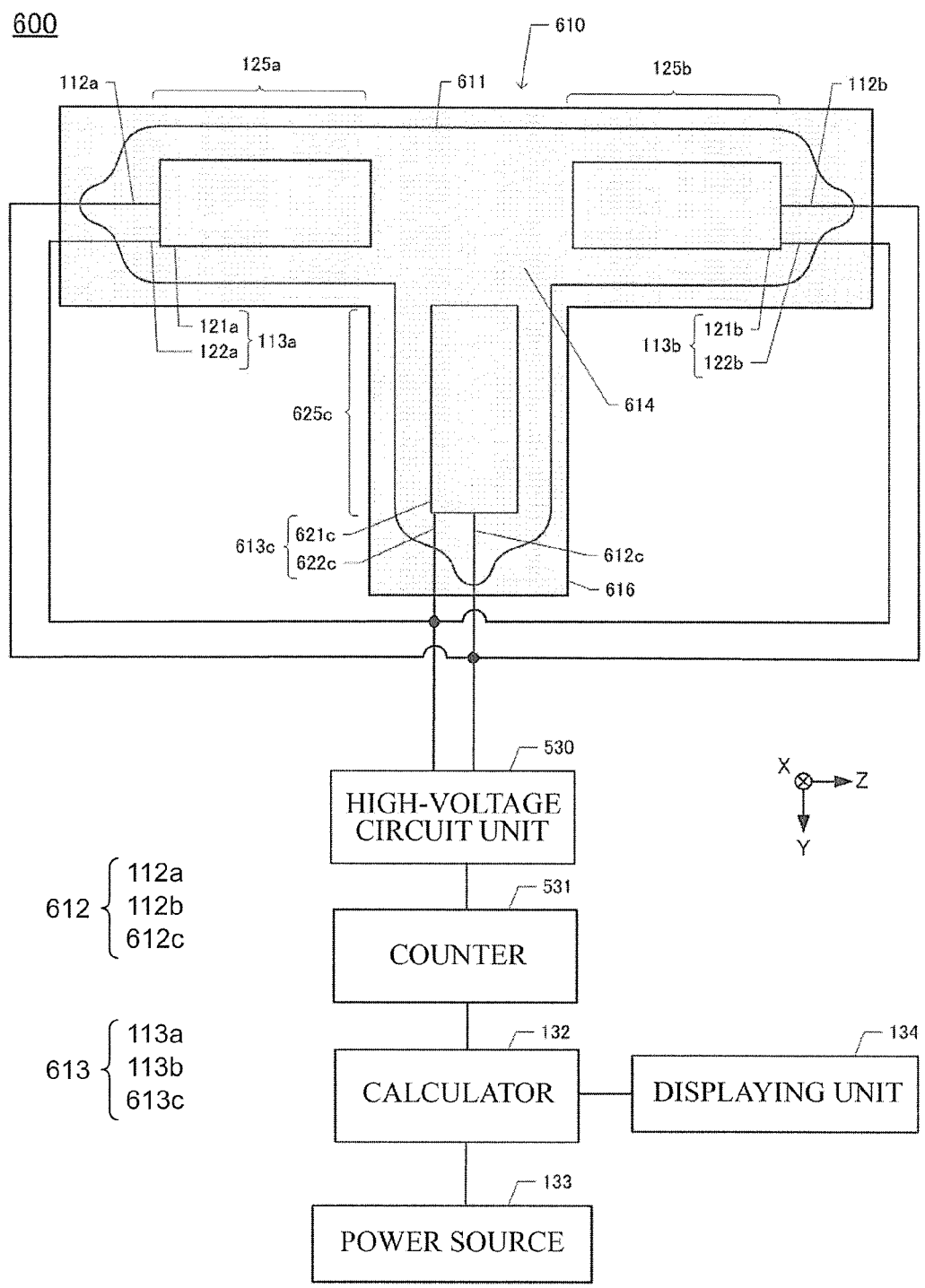
FIG. 8 is a schematic configuration diagram of a radiation measurement apparatus 600.

FIG. 8 is a schematic configuration diagram of the radiation measurement apparatus 600. The radiation measurement apparatus 600 is constituted including a Geiger-Muller counter tube 610, the high-voltage circuit unit 530, the counter 531, the calculator 132, the displaying unit 134, and the power source 133.

The Geiger-Muller counter tube 610 is constituted of an enclosing tube 611, an anode conductor 612, and a cathode conductor 613. In the enclosing tube 611, a cylindrical glass tube is formed so as to extend in the +Z-axis direction, −Z-axis direction, and +Y-axis direction respectively. A space 614 inside the enclosing tube 611 is sealed.

The anode conductor 612 is constituted of the first anode conductor 112a, the second anode conductor 112b, and a third anode conductor 612c. The third anode conductor 612c is constituted of an anode electrode (not illustrated) and a first metal lead portion (not illustrated) and is disposed in the space which extends in the +Y-axis direction in the enclosing tube 611. The third anode conductor 612c is formed in the same shape with the first anode conductor 112a and the second anode conductor 112b. The third anode conductor 612c is different from the first anode conductor 112a and the second anode conductor 112b only in an arrangement position inside the enclosing tube 611. The third anode conductor 612c is secured to the enclosing tube 611 by being supported at the end of the +Y-axis side of the enclosing tube 611.

The cathode conductor 613 is constituted of the first cathode conductor 113a, the second cathode conductor 113b, and a third cathode conductor 613c. The third cathode conductor 613c is constituted of a cathode electrode 621c and a second metal lead portion 622c, and is disposed inside the space which extends in the +Y-axis direction in the enclosing tube 611. The third cathode conductor 613c has the same shape with the first cathode conductor 113a and the second cathode conductor 113b. The third cathode conductor 613c is different from the first cathode conductor 113a and the second cathode conductor 113b only in an arrangement position inside the enclosing tube 611. The third cathode conductor 613c is secured to the enclosing tube 611 with the second metal lead portion 622c being supported at the end of the +Y-axis side of the enclosing tube 611.

The Geiger-Muller counter tube 610 includes a third radiation detecting unit 625c which is constituted of the third anode conductor 612c and the third cathode conductor 613c together with the first radiation detecting unit 125a and the second radiation detecting unit 125b. The third radiation detecting unit 625c is the radiation detecting unit which is formed in the similar shape with the first radiation detecting unit 125a and the second radiation detecting unit 125b. The third radiation detecting unit 625c is different from the first radiation detecting unit 125a and the second radiation detecting unit 125b only in an arrangement position inside the enclosing tube 611.

In the radiation measurement apparatus 600, the first cathode conductor 113a, the second cathode conductor 113b, and the third cathode conductor 613c of the Geiger-Muller counter tube 610 are electrically connected together and connected to the high-voltage circuit unit 530. Further, the first anode conductor 112a, the second anode conductor 112b, and the third anode conductor 612c are electrically connected together and connected to the high-voltage circuit unit 530. That is, the first radiation detecting unit 125a, the second radiation detecting unit 125b, and the third radiation detecting unit 625c are connected in parallel with respect to the high-voltage circuit unit 530.

The counter 531 is connected to the high-voltage circuit unit 530. The pulse signals detected by the first radiation detecting unit 125a, the second radiation detecting unit 125b, and the third radiation detecting unit 625c are counted by the counter 531. That is, the counter 531 counts the total of the pulse signals detected by the first radiation detecting unit 125a, the second radiation detecting unit 125b, and the third radiation detecting unit 625c. The calculator 132 is connected to the counter 531, and the power source 133 and the displaying unit 134 is connected to the calculator 132.

In the radiation measurement apparatus 600, as illustrated in FIG. 8, a shielding portion 616, which blocks β-ray, can be mounted to the enclosing tube 611 so as to surround the enclosing tube 611 from the outside. Thus, the radiation measurement apparatus 600 can measure both β-ray and γ-ray. This measurement, for example, can be performed as follows: the total value of β-ray and γ-ray is measured by performing the measurement without mounting the shielding portion 616, further the value of γ-ray is measured by performing the measurement with mounting the shielding portion 616, and then the value of β-ray is calculated by subtracting the value of γ-ray from the total value of β-ray and γ-ray.

In the radiation measurement apparatus 600, the radiation-detection sensitivity becomes higher than the radiation measurement apparatus 500 due to including the three radiation detecting units. In addition, with the use of the shielding portion 616, each value of γ-ray and γ-ray can be measured. In the radiation measurement apparatus 600, even without measuring β-ray and γ-ray simultaneously, β-ray can be measured with high radiation-detection sensitivity due to the high radiation-detection sensitivity of the radiation measurement apparatus itself.

[Configuration of Radiation Measurement Apparatus 700]

Figure 9:
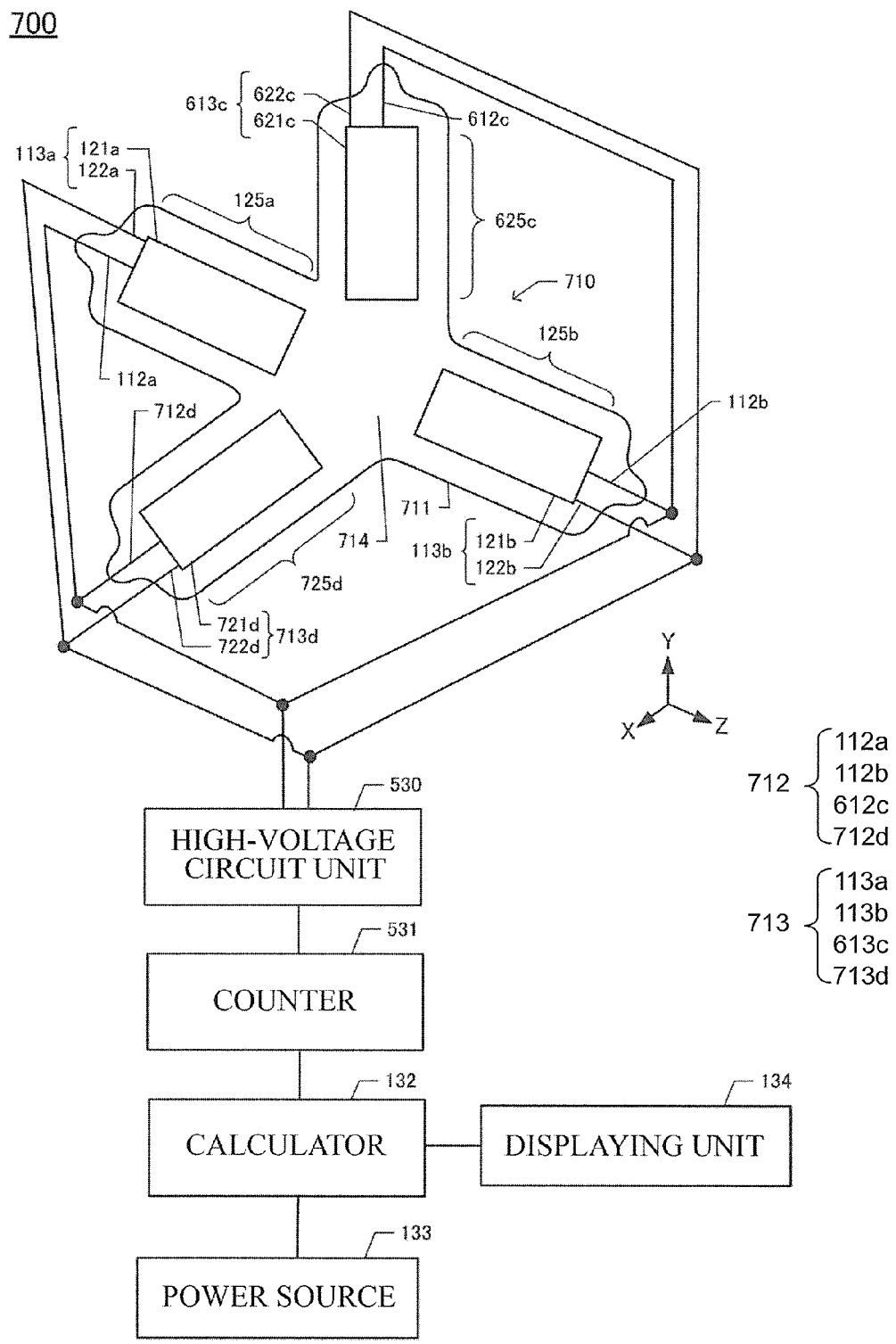
FIG. 9 is a schematic configuration diagram of a radiation measurement apparatus 700.

FIG. 9 is a schematic configuration diagram of the radiation measurement apparatus 700. The radiation measurement apparatus 700 is constituted including a Geiger-Muller counter tube 710, the high-voltage circuit unit 530, the counter 531, the calculator 132, the displaying unit 134, and the power source 133.

The Geiger-Muller counter tube 710 is constituted of an enclosing tube 711, an anode conductor 712, and a cathode conductor 713. In the enclosing tube 711, a cylindrical glass tube is formed so as to extend in the +Z-axis direction, −Z-axis direction, +Y-axis direction, and +X-axis direction respectively. A space 714 inside the enclosing tube 711 is sealed.

The anode conductor 712 is constituted of the first anode conductor 112a, the second anode conductor 112b, the third anode conductor 612c, and a fourth anode conductor 712d. The fourth anode conductor 712d is constituted of an anode electrode (not illustrated), and a first metal lead portion (not illustrated), and is disposed inside a space which extends in the +X-axis direction in the enclosing tube 711. The fourth anode conductor 712d has the same shape with the first anode conductor 112a and the second anode conductor 112b. The fourth anode conductor 712d is different from the first anode conductor 112a and the second anode conductor 112b only in an arrangement position inside the enclosing tube 711. The fourth anode conductor 712d is secured to the enclosing tube 711 by being supported at the end of the +X-axis side of the enclosing tube 711.

The cathode conductor 713 is constituted of the first cathode conductor 113a, the second cathode conductor 113b, the third cathode conductor 613c, and a fourth cathode conductor 713d. The fourth cathode conductor 713d is constituted of a cathode electrode 721d and a second metal lead portion 722d, and is disposed inside the space which extends in the +X-axis direction in the enclosing tube 711. The fourth cathode conductor 713d has the same shape with the first cathode conductor 113a and the second cathode conductor 113b. The fourth cathode conductor 713d is different from the first cathode conductor 113a and the second cathode conductor 113b only in an arrangement position inside the enclosing tube 711. The fourth cathode conductor 713d is secured to the enclosing tube 711 with the second metal lead portion 722d being supported at the end of the +X-axis side of the enclosing tube 711.

The Geiger-Muller counter tube 710 includes a fourth radiation detecting unit 725d which is constituted of the fourth anode conductor 712d and the fourth cathode conductor 713d together with the first radiation detecting unit 125a, the second radiation detecting unit 125b, and the third radiation detecting unit 625c. The fourth radiation detecting unit 725d is the radiation detecting unit which is formed in the similar shape with the first radiation detecting unit 125a and the second radiation detecting unit 125b. The fourth radiation detecting unit 725d is different from the first radiation detecting unit 125a and the second radiation detecting unit 125b only in an arrangement position inside the enclosing tube 711.

In the radiation measurement apparatus 700, the radiation-detection sensitivity becomes higher than the radiation measurement apparatus 500 and 600 due to including four radiation detecting units. In addition, similar to the radiation measurement apparatus 600, each value of β-ray and γ-ray can be measured by covering the Geiger-Muller counter tube 710 with a shielding portion (not illustrated).

[Fifth Embodiment]

In the Geiger-Muller counter tube, by the arrangement of a bead formed of an insulator to a part of the anode electrode, the gap between the anode electrode and the cathode electrode may be adjusted so as to be the predetermined gap. The following description describes the Geiger-Muller counter tube 810 where the bead is disposed to a part of the anode electrode. Like reference numerals designate corresponding or identical elements throughout the first embodiment, and therefore such elements will not be further elaborated here.

Configuration of Geiger-Muller Counter Tube 810

Figure 10A:
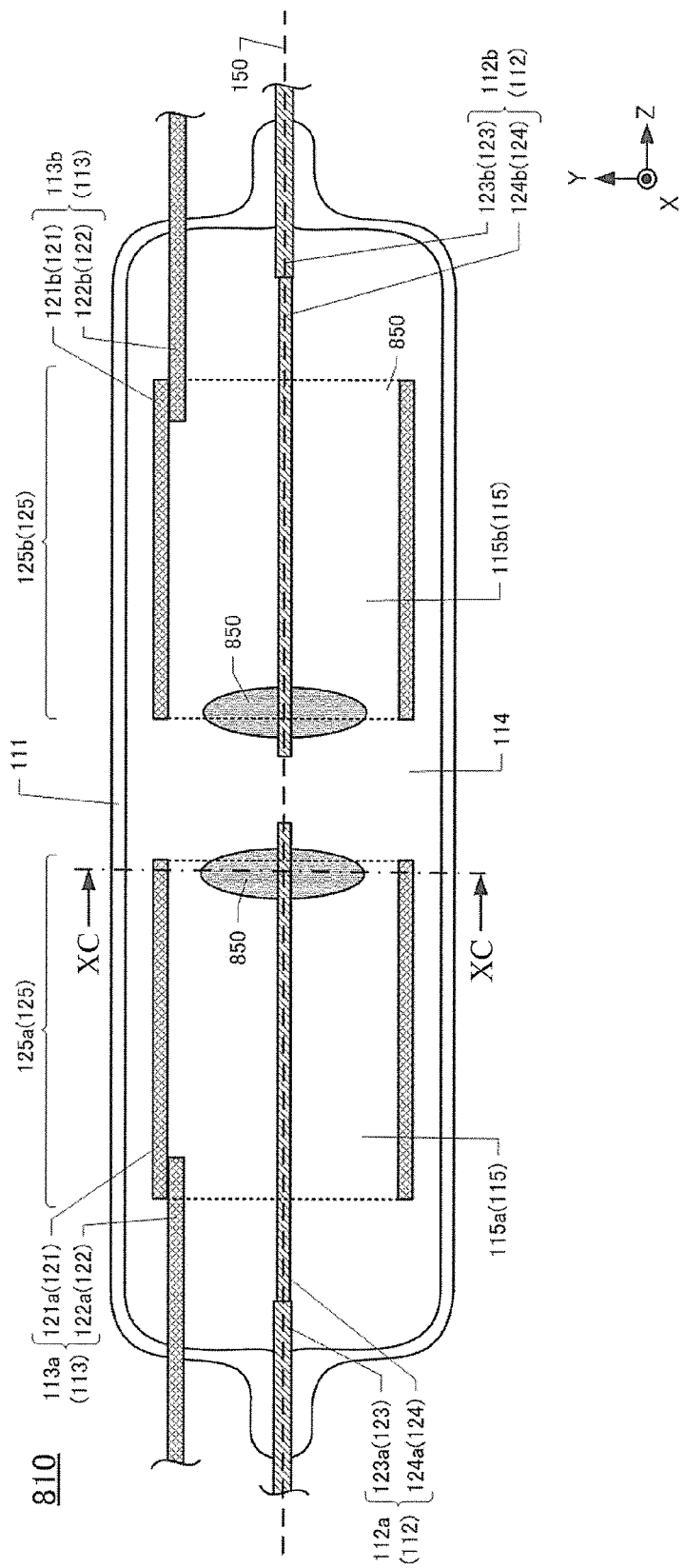
FIG. 10A is a cross-sectional view of a Geiger-Muller counter tube 810.

FIG. 10A is a cross-sectional view of the Geiger-Muller counter tube 810. The Geiger-Muller counter tube 810 is constituted of the enclosing tube 111, the anode conductor 112, the cathode conductor 113, and a bead 850. The Geiger-Muller counter tube 810 is constituted where, in the Geiger-Muller counter tube 110 (see FIG. 1A), the bead 850 is mounted to the anode electrode 124 and disposed in the position at which the bead 850 is surrounded by the cathode electrode 121. The beads 850 are respectively mounted to the anode electrode 124a and the anode electrode 124b, and are respectively disposed near the opening of the +Z-axis side of the cathode electrode 121a and near the opening of the −Z-axis side of the cathode electrode 121b.

Figure 10B:
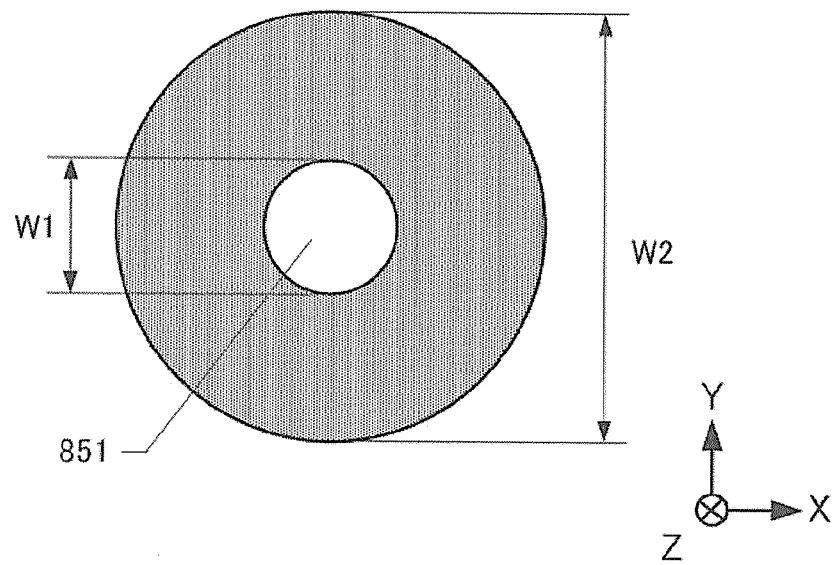
FIG. 10B is a plan view of a bead 850.

FIG. 10B is a plan view of the bead 850. The bead 850 has the outer shape of, for example, a rotational ellipsoid and has a through-hole 851 which passes through the bead 850 along the short axis of the rotational ellipsoid. The anode electrode 124 passes through the through-hole 851 of the bead 850, and thus the bead 850 is secured to the anode electrode 124. Accordingly, assume that W1 is a diameter of the through-hole 851 of the bead 850, the size of the diameter W1 is formed so as to be equal to or more than a diameter of the anode electrode 124. In addition, the bead 850 is disposed so as to be surrounded by the cathode electrode 121 inside a XY plane. Thus, assume that W2 is an outside diameter of the bead 850 inside the XY plane, the outside diameter W2 is formed so as to be smaller than an inside diameter of the cathode electrode 121.

The bead 850 is formed of an insulator so as to keep electrical insulation between the anode electrode 124 and the cathode electrode 121. Furthermore, an inert gas and a quenching gas are enclosed inside the enclosing tube 111. However, when other gas is additionally mixed inside the enclosing tube 111, the characteristics of the Geiger-Muller counter tube is affected. Therefore, the material of the bead 850 is preferred not to be a source of generation of gas. So as to fulfill these requirements described above, the bead 850 is formed of, for example, hard glass, molybdenum glass, ceramic, plastic or similar material.

Figure 10C:
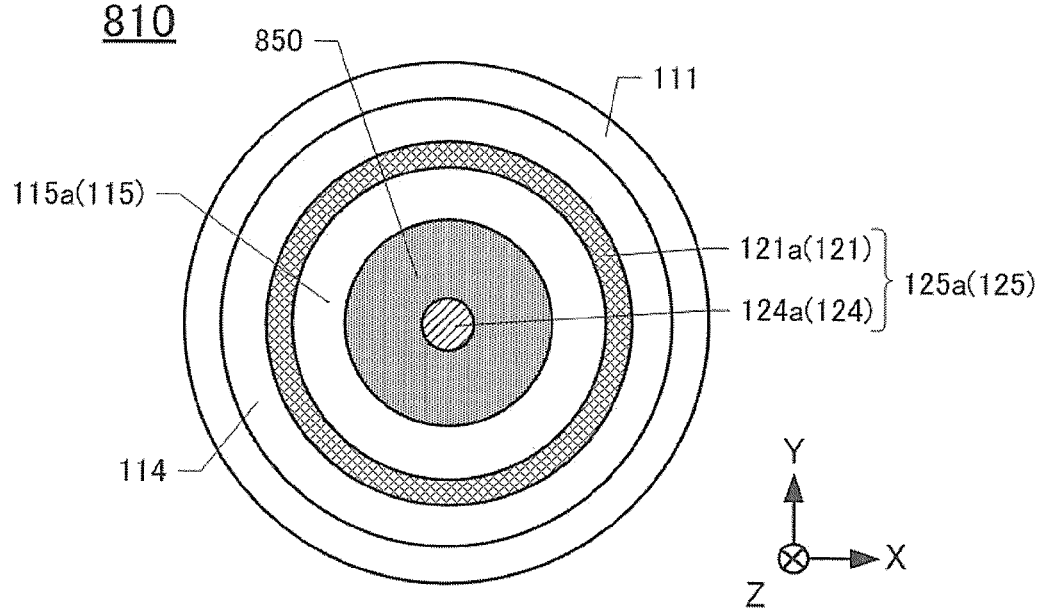
FIG. 10C is a cross-sectional view taken along the line XC-XC of FIG. 10A.

FIG. 10C is a cross-sectional view taken along the line XB-XB of FIG. 10A. In the Geiger-Muller counter tube, the anode electrode is preferred to be disposed on the central axis of the cathode electrode but deviates from the central axis in some cases. This causes the variation of the characteristics of the Geiger-Muller counter tube. In particular, when the difference between the inside diameter of the cathode electrode and the outside diameter of the anode electrode is large, the variation becomes larger. Further, in the manufacturing process, it is not easy to stably arrange the anode electrode on the central axis of the cathode electrode. In the Geiger-Muller counter tube 810, as illustrated in FIG. 10C, the bead 850 is mounted to the anode electrode 124 and keeps the gap between the anode electrode 124 and the cathode electrode 121 in a predetermined range. This facilitates the arranging of the anode electrode 124 near the central axis of the cathode electrode 121. Accordingly, production of the Geiger-Muller counter tube is facilitated, and the variation of the characteristics of the Geiger-Muller counter tube can be suppressed.

Securing of the bead 850 to the anode electrode 124 can be performed, for example, by filling low melting point glass or similar material into the gap between the anode electrode 124 and the through-hole 851 so as to close the gap. Furthermore, by decreasing the difference between the diameter W1 of the bead 850 and the outside diameter of the anode electrode 124, the securing of the bead 850 to the anode electrode 124 may be performed by increasing the friction force between the bead 850 and the anode electrode 124. In addition, when the bead 850 is made of glass, the bead 850 may be formed as follows: molten glass is directly applied over the anode electrode 124 and cooled.

In the Geiger-Muller counter tube 810, the beads 850 are disposed near the opening of the +Z-axis side of the cathode electrode 121a and near the opening of the −Z-axis side of the cathode electrode 121b. However, the positions to arrange the beads 850 are not limited to these positions, that is, the bead 850 may be disposed at any position as long as the position is surrounded by the cathode electrode 121. Additionally, in FIG. 10A, the beads 850 may be additionally disposed at a plurality of positions at one single anode electrode such as near the opening of the −Z-axis side of the cathode electrode 121a and near the opening of the +Z-axis side of the cathode electrode 121b.

Further, the outer shape of the bead 850 may be formed in various shapes such as a cylindrical shape, a discoidal shape, an ellipsoidal shape, a spherical shape, or an annular ring shape (torus body).

[Configuration of Geiger-Muller Counter Tube 10]

Figure 11A:
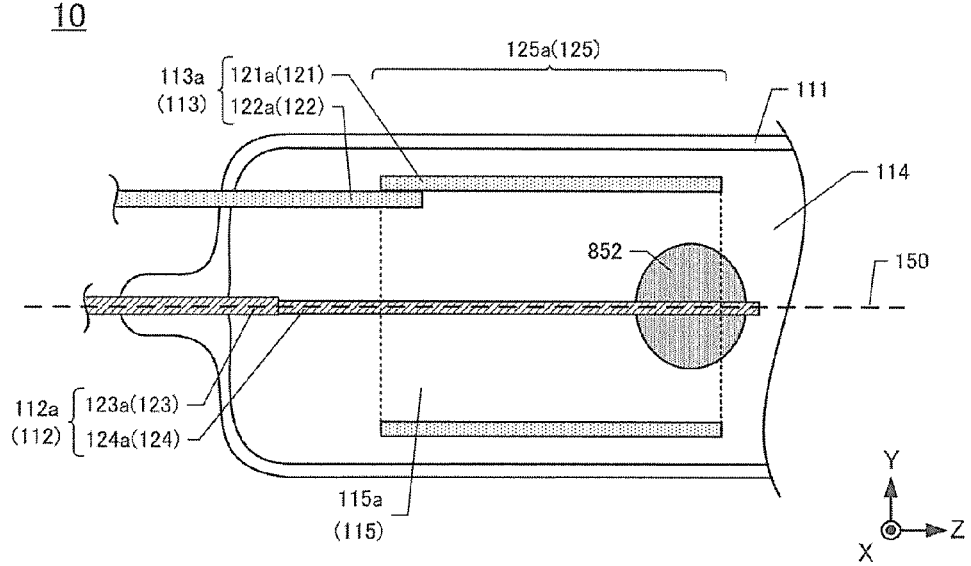
FIG. 11A is a partial cross-sectional view of a Geiger-Muller counter tube 10.

FIG. 11A is a partial cross-sectional view of the Geiger-Muller counter tube 10. The Geiger-Muller counter tube 10 is constituted of the enclosing tube 111, the anode conductor 112, the cathode conductor 113, and a bead 852. The Geiger-Muller counter tube 10 is one where, in the Geiger-Muller counter tube 810 illustrated in FIG. 10A, the bead 850 is replaced to the bead 852, and the other configuration is the same as the Geiger-Muller counter tube 810. Additionally, in FIG. 11A, only half of the cross-sectional view in the −Z-axis side of the Geiger-Muller counter tube 10 is illustrated. The bead 852 is also formed in the half of the +Z-axis side.

In the bead 850 of the Geiger-Muller counter tube 810 illustrated in FIG. 10A, the bead is preliminarily formed with the through-hole 851 and then mounted to the anode electrode 124. However, the bead may be directly formed to the anode electrode 124. The bead 852 as illustrated in FIG. 11A is formed in the following method, i.e., molten low melting point glass is directly applied over the anode electrode 124, and then is solidified in a near spherical shape.

[Configuration of Bead 853]

Figure 11B:
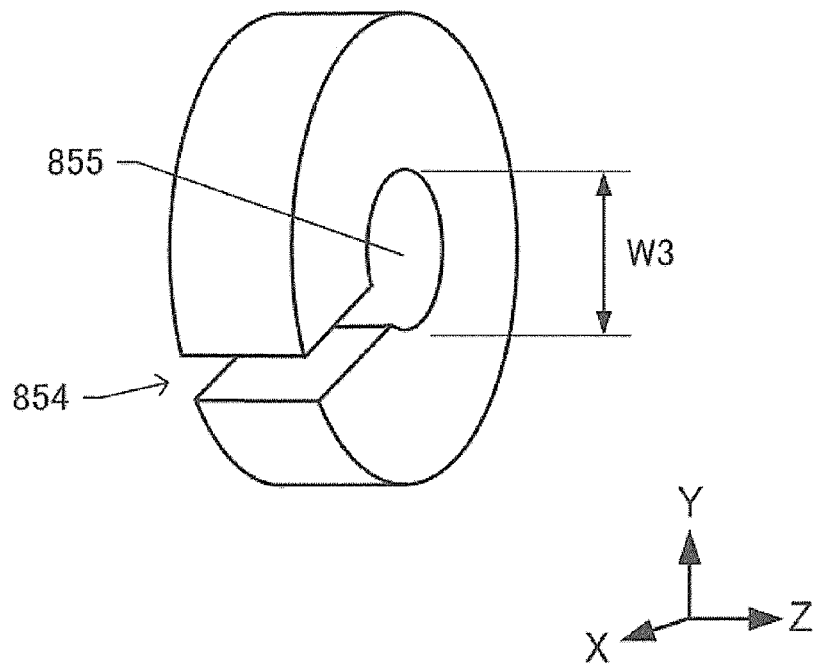
FIG. 11B is a schematic perspective view of a bead 853.

FIG. 11B is a schematic perspective view of the bead 853. In the Geiger-Muller counter tube 810, the bead 853 where a slit 854 is formed may be employed instead of the bead 850. The outer shape of the bead 853 is formed in a discoidal shape, and a through-hole 855 at the center of the bead 853 and the outer periphery of the bead 853 are connected by the slit 854. In addition, in the bead 853, a diameter W3 of the through-hole 855 is formed so as to be smaller than the outside diameter of the anode electrode 124. In the bead 853, the slit 854 being widened temporarily, the diameter W3 can be widened larger than the outside diameter of the anode electrode 124. This facilitates the mounting of the bead 853 to the anode electrode 124. Further, the diameter W3 is ordinarily smaller than the outside diameter of the anode electrode 124. Accordingly, when the bead 853 is mounted to the anode electrode 124, the bead 853 can more strongly hold the anode electrode 124, which is preferred.

[Configuration of Geiger-Muller Counter Tube 20]

Figure 12A:
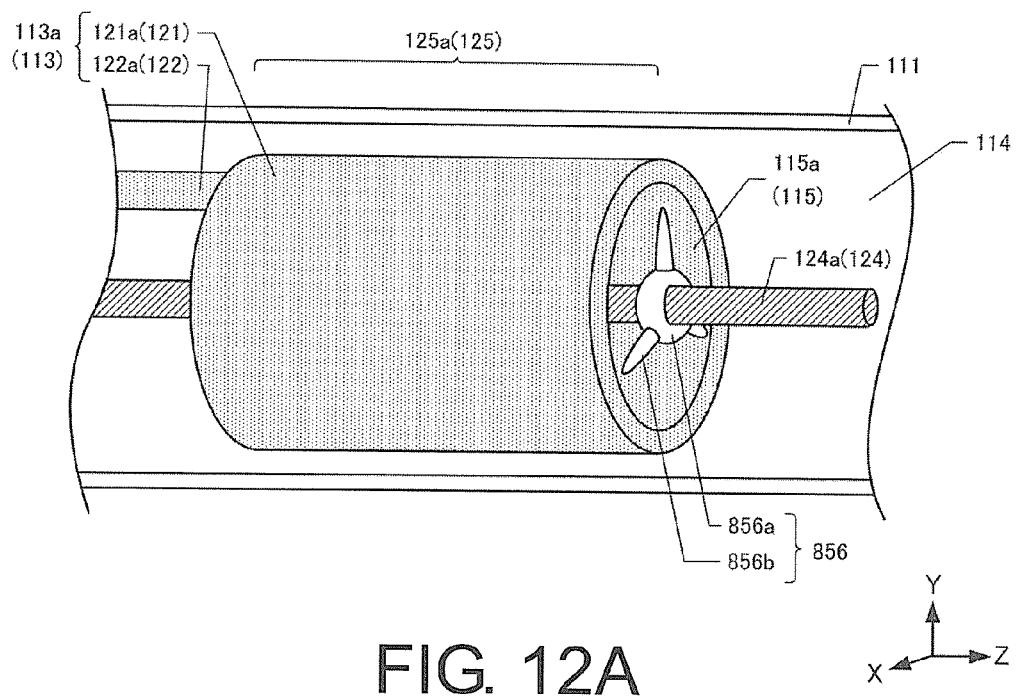
FIG. 12A is a schematic partial perspective view of a Geiger-Muller counter tube 20.

FIG. 12A is a schematic partial perspective view of the Geiger-Muller counter tube 20. The Geiger-Muller counter tube 20 is constituted including the enclosing tube 111, the anode conductor 124, the cathode conductor 113, and a bead 856 which is mounted to the anode electrode 124. The Geiger-Muller counter tube 20 is constituted where, in the Geiger-Muller counter tube 810, the bead 850 is replaced to the bead 856. Similar to the bead 850, the bead 856 is disposed at the tip side of the anode electrode 124 inside the space 115.

Figure 12B:
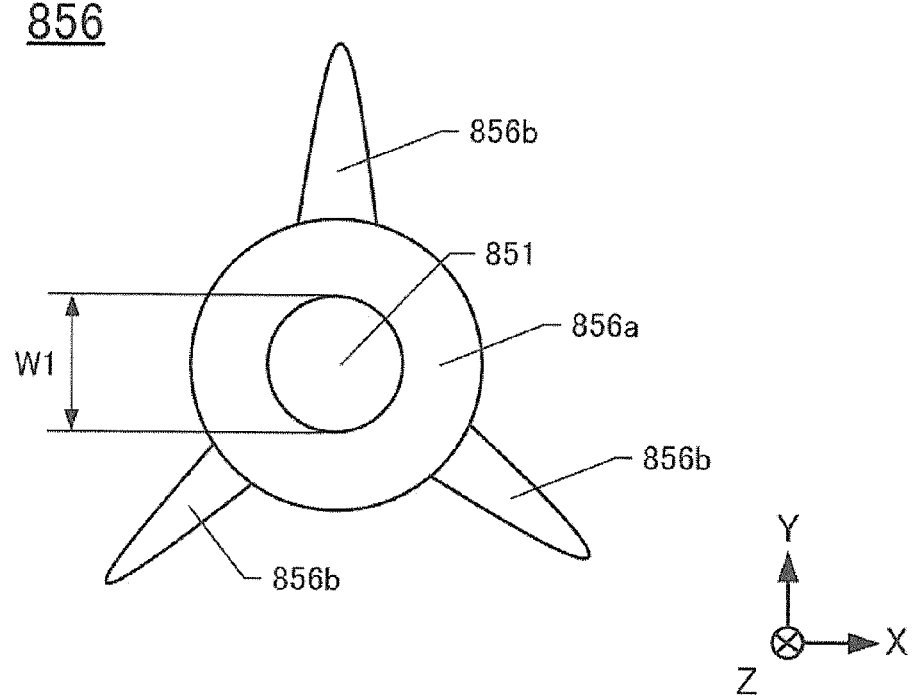
FIG. 12B is a plan view of a bead 856.

FIG. 12B is a plan view of the bead 856. The bead 856 is constituted of a body 856a and three protrusions 856b. The body 856a is mounted to the anode electrode 124, and three protrusions 856b are mounted to the body 856a. Further, each protrusion 856b is disposed, for example, on the outer periphery of the body 856a at regular intervals. In the Geiger-Muller counter tube 20, by the protrusions 856b, the gap between the anode electrode 124 and the cathode electrode 121 is kept within a range of a predetermined distance where the variation of the characteristics of the Geiger-Muller counter tube 20 is suppressed within an allowable range.

In the bead 850 (see FIG. 10A), when the outside diameter W2 is made large to arrange the anode electrode 124 near the central axis of the cathode electrode 121, there is a concern that the bead 850 closes the opening of the cathode electrode 121, and a flow of the gas inside and outside of the space 115 becomes poor. Accordingly, there is a concern that the characteristics of the Geiger-Muller counter tube are affected due to generation of a concentration difference of the gas inside and outside of the space 115. When using the bead 856, the anode electrode 124 is disposed near the central axis of the cathode electrode 121 by the protrusion 856b, and at the same time the bead 856 does not close the opening of the cathode electrode 121. Accordingly, generation of the concentration difference of the gas inside and outside of the space 115 is prevented, and influence to the characteristics of the Geiger-Muller counter tube is prevented.

[Configuration of Geiger-Muller Counter Tube 30]

Figure 13A:
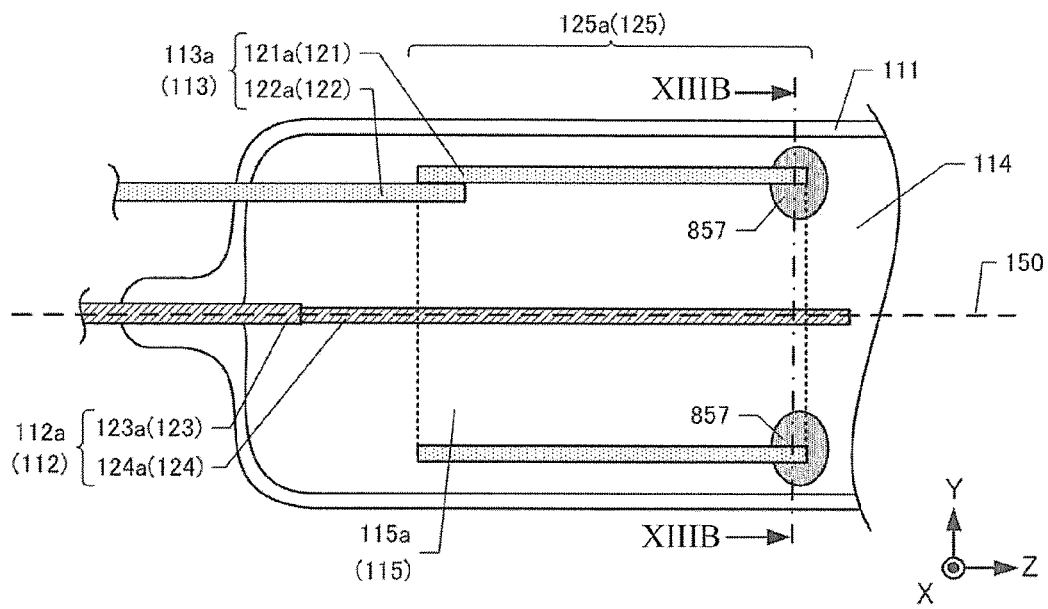
FIG. 13A is a schematic cross-sectional view of a Geiger-Muller counter tube 30.

FIG. 13A is a schematic cross-sectional view of the Geiger-Muller counter tube 30. The Geiger-Muller counter tube 30 is constituted including the enclosing tube 111, the anode conductor 112, the cathode conductor 113, and a ring 857 that is mounted to the cathode electrode 121. The ring 857 is disposed so as to cover the edge of the opening of the cathode electrode 121 in the side where the anode electrode 124 passes through from the space 115.

The ring 857 can be formed, for example, by the application of low melting point glass over the peripheral area of the opening of the cathode electrode 121 and then by the cooling of the glass. Additionally, the ring 857 can be formed as follows: a ring formed of the insulator such as hard glass, molybdenum glass, ceramic, or plastic is engaged into the opening of the cathode electrode 121, or the ring is secured to the opening of the cathode electrode 121 with the use of an adhesive material such as low melting point glass.

Figure 13B:
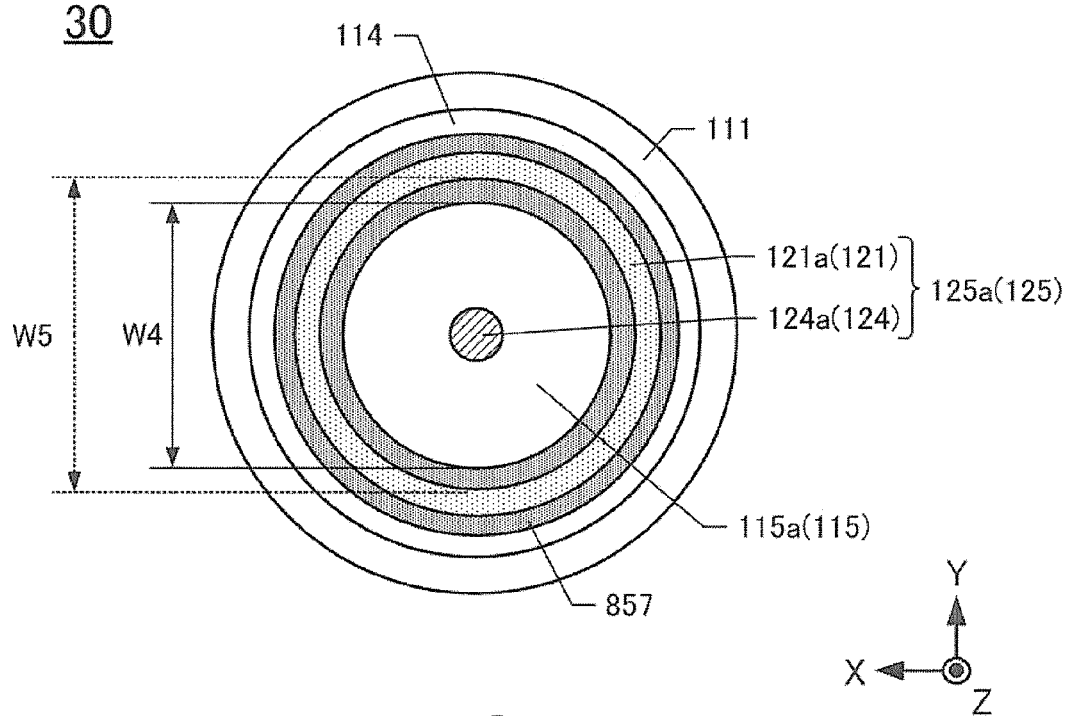
FIG. 13B is a cross-sectional view taken along the line XIIIB-XIIIB of FIG. 13A.

FIG. 13B is a cross-sectional view taken along the line XIIIB-XIIIB of FIG. 13A. The ring 857 is formed in the peripheral area of the cathode electrode 121. Further, assume that the inside diameter of the cathode electrode 121 is W5 and that of the ring 857 is W4, the inside diameter W4 of the ring 857 is formed so as to be smaller than the inside diameter W5 of the cathode electrode 121. This ensures the prevention of short circuit due to contact between the cathode electrode 121 and the anode electrode 124 even when the anode electrode 124 deviates from the central axis of the cathode electrode 121.

In addition, in the Geiger-Muller counter tube 30, by decreasing the size of the inside diameter W4, the position of the anode electrode 124 can be limited to the position near the central axis of the cathode electrode 121. Furthermore, when the bead is mounted to the anode electrode, there is a concern that the anode electrode deforms due to the weight of the bead in some cases. However, because the diameter of the cathode electrode is larger than the anode electrode, and thus the cathode electrode is hardly deformed, there is no need to worry about the deformation or a similar defect of the cathode electrode.

[Sixth Embodiment]

In the Geiger-Muller counter tube, the cathode electrode in the side surface of which a through-hole is formed may be employed. The following description describes the Geiger-Muller counter tube that employs the cathode electrode in the side surface of which a through-hole is formed. Like reference numerals designate corresponding or identical elements throughout the first embodiment, and therefore such elements will not be further elaborated here.

[Configuration of Geiger-Muller Counter Tube 40]

Figure 14A:
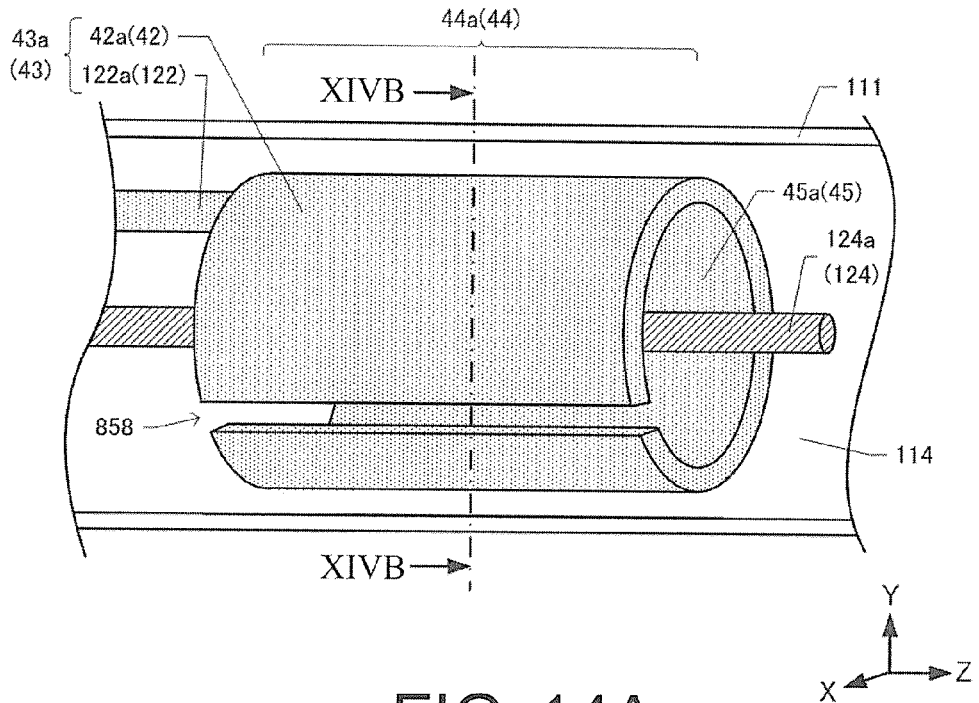
FIG. 14A is a partial perspective view of a Geiger-Muller counter tube 40.

FIG. 14A is a partial perspective view of the Geiger-Muller counter tube 40. The Geiger-Muller counter tube 40 is constituted of the enclosing tube 111, the anode conductor 124, and a cathode conductor 43. The Geiger-Muller counter tube 40 is one where, in the Geiger-Muller counter tube 110 (see FIG. 1A), the cathode electrode 121 is replaced to a cathode electrode 42, and the other configuration is the same as the Geiger-Muller counter tube 110. Further, in the FIG. 14A, only half of the perspective view of the −Z-axis side of the Geiger-Muller counter tube 40 is illustrated.

The cathode conductor 43 is constituted of a first cathode conductor 43a and a second cathode conductor 43b (not illustrated). The first cathode conductor 43a is disposed in the −Z-axis side of the Geiger-Muller counter tube 40 and the second cathode conductor 43b is disposed in the +Z-axis side of the Geiger-Muller counter tube 40. The first cathode conductor 43a includes a cylindrical cathode electrode 42a and the linear second metal lead portion 122a. The cathode electrode 42a surrounds the peripheral area of the anode electrode 124a in the space 114. The second metal lead portion 122a is connected to the cathode electrode 42a and supported at the end of the enclosing tube 111. Similarly, the second cathode conductor 43b includes a cathode electrode 42b (not illustrated) and the linear second metal lead portion 122b. The cathode electrode 42b surrounds the peripheral area of the anode electrode 124b and has the same shape as the cathode electrode 42a. The second metal lead portion 122b is connected to the cathode electrode 42b and supported at the end of the enclosing tube 111.

A radiation detecting unit 44 which detects the radiation is constituted of the anode electrode 124 and the cathode electrode 42 that surrounds the anode electrode 124. The radiation detecting unit 44 includes a first radiation detecting unit 44a and a second radiation detecting unit 44b (not illustrated). The first radiation detecting unit 44a is constituted of the cathode electrode 42a and the anode electrode 124a, and the second radiation detecting unit 44b is constituted of the cathode electrode 42b and the anode electrode 124b. Further, the radiation detecting unit 44 has a space 45 that is a space to detect the radiation. The space 45 has a space 45a surrounded by the cathode electrode 42a and a space 45b (not illustrated) surrounded by the cathode electrode 42b (not illustrated).

The cathode electrode 42 is formed where a rectangular metal sheet is rolled into a cylindrical shape. The rectangular metal sheet is formed of, for example, metallic Kovar that is an alloy of iron, nickel, and cobalt or stainless steel. Further, the cathode electrode 42 is rolled in the shape where both end sides of the metal sheet are separated so as not to overlap the end sides one another. Thus, a slit-shaped through-hole 858 extending in the Z-axis direction is formed in the side surface of the cathode electrode 42. The through-hole 858 connects the inside and outside of the space 45.

Figure 14B:
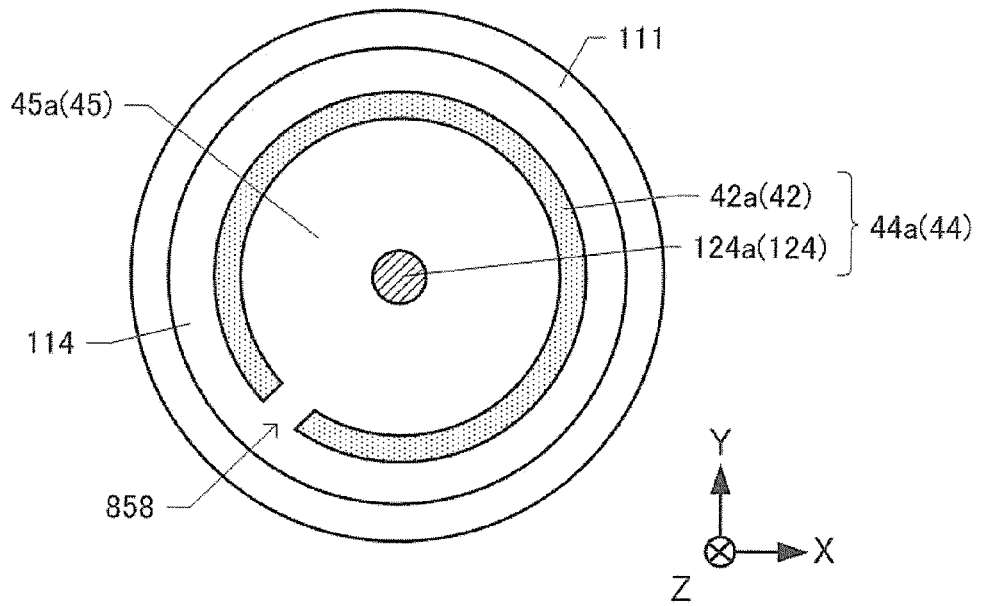
FIG. 14B is a cross-sectional view taken along the line XIVB-XIVB of FIG. 14A.

FIG. 14B is a cross-sectional view taken along the line XIVB-XIVB of FIG. 14A. The anode electrode 124a is disposed on the central axis of the cathode electrode 42a. Accordingly, when a voltage is applied between the cathode electrode 42a and the anode electrode 124a, inside the XY plane, the electric field of the space 45a surrounded by the cathode electrode 42a is formed with rotational symmetry around the anode electrode 124a.

In the conventional Geiger-Muller counter tube where the through-hole 858 is not formed in the cathode electrode, the degree of vacuum is poor when the Geiger-Muller counter tube is drawn a vacuum. The poor degree of vacuum causes the variations in the quality of the products in some cases. In addition, it takes time to inject the inert gas and the quenching gas into the Geiger-Muller counter tube after drawing a vacuum on the enclosing tube.

In the Geiger-Muller counter tube 40 including the cathode electrode 42 where the through-hole 858 is formed, ventilation of the gas inside and outside of the space 45 is improved by the through-hole 858. Thus, compared with the conventional Geiger-Muller counter tube, the inside of the enclosing tube 111 can be drawn a higher vacuum, and the injection time of the gas can be shortened. Accordingly, the quality of the Geiger-Muller counter tube can be more stabilized, and production times can be shortened.

Further, the formation of the through-hole in the cathode electrode increases detection sensitivity of the radiation. The flow of the gas is less likely to occur inside the enclosing tube where the gas is enclosed. Thus it is very likely that the concentration difference of the inert gas or similar gases will easily occur between the space 45 in the radiation detecting unit 44 and the space outside the space 45 due to such as ionization of the inert gas by the radiation. Therefore, in the Geiger-Muller counter tube 40, it is very likely that the formation of the through-hole 858 in the cathode electrode 42 will reduce the concentration difference.

[Configuration of Geiger-Muller Counter Tube 50]

Figure 15A:
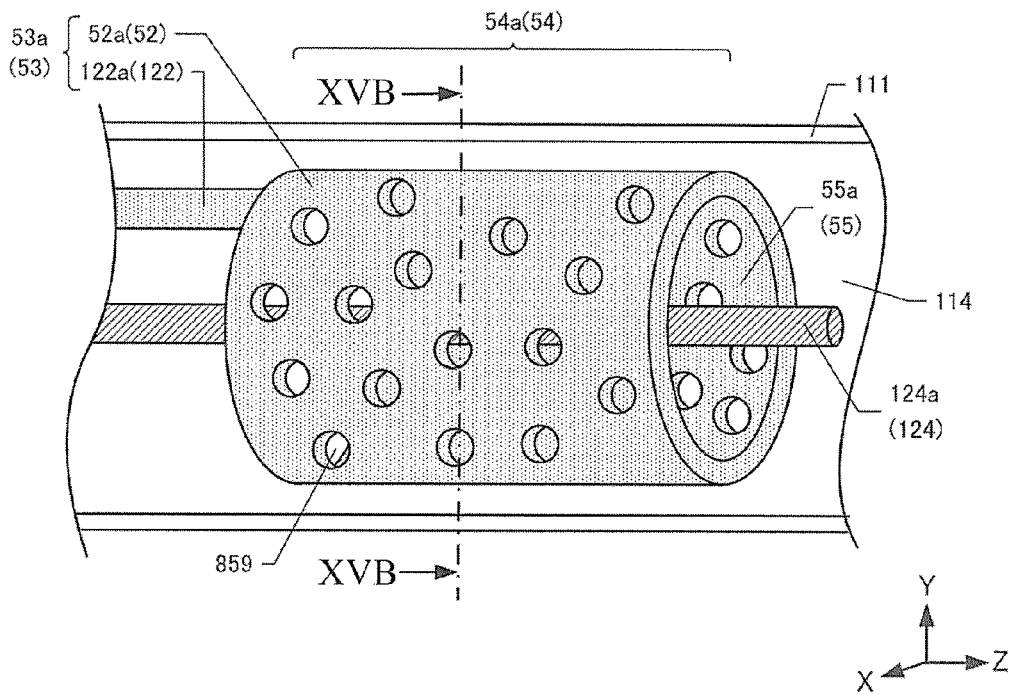
FIG. 15A is a partial perspective view of a Geiger-Muller counter tube 50.

FIG. 15A is a partial perspective view of the Geiger-Muller counter tube 50. The Geiger-Muller counter tube 50 is constituted of the enclosing tube 111, the anode conductor 124, and a cathode conductor 53. The Geiger-Muller counter tube 50 is one where, in the Geiger-Muller counter tube 110 (see FIG. 1A), the cathode electrode 121 is replaced to a cathode electrode 52, and the other configuration is the same as the Geiger-Muller counter tube 110. Further, in the FIG. 15A, only half of the perspective view of the −Z-axis side of the Geiger-Muller counter tube 50 is illustrated.

The cathode conductor 53 is constituted of a first cathode conductor 53a and a second cathode conductor 53b (not illustrated). The first cathode conductor 53a is disposed in the −Z-axis side of the Geiger-Muller counter tube 50, and the second cathode conductor 53b is disposed in the +Z-axis side of the Geiger-Muller counter tube 50. The first cathode conductor 53a includes a cylindrical cathode electrode 52a and the linear second metal lead portion 122a. The cathode electrode 52a surrounds the peripheral area of the anode electrode 124a in the space 114. The second metal lead portion 122a is connected to the cathode electrode 52a and supported at the end of the enclosing tube 111. Similarly, the second cathode conductor 53b includes a cathode electrode 52b (not illustrated) and the linear second metal lead portion 122b. The cathode electrode 52b surrounds the peripheral area of the anode electrode 124b and has the same shape as the cathode electrode 52a. The second metal lead portion 122b is connected to the cathode electrode 52b and supported at the end of the enclosing tube 111.

A radiation detecting unit 54 which detects the radiation is constituted of the anode electrode 124 and the cathode electrode 52 that surrounds the anode electrode 124. The radiation detecting unit 54 includes a first radiation detecting unit 54a and a second radiation detecting unit 54b (not illustrated). The first radiation detecting unit 54a is constituted of the cathode electrode 52a and the anode electrode 124a, and the second radiation detecting unit 54b is constituted of the cathode electrode 52b and the anode electrode 124b. Further, the radiation detecting unit 54 has a space 55 that is a space to detect the radiation. The space 55 has a space 55a which is surrounded by the cathode electrode 52a and a space 55b (not illustrated) which is surrounded by the cathode electrode 52b (not illustrated).

In the side surface of each cathode electrode, a plurality of through-holes 859 are formed. The plurality of through-holes 859 may be formed regularly or randomly in the side surface of the cathode electrode 52. FIG. 15A illustrates the state where the plurality of through-holes 859 are randomly formed. Further, the shape of each through-hole 859 is formed in a circular shape in FIG. 15A; however, the shape may be formed in various shapes such as an ellipse or a polygonal, not limited to the circular shape. Similar to the cathode electrode 42a (see FIG. 14A), the cathode electrode 52a can be formed where a rectangular metal sheet is rolled into a cylindrical shape. The rectangular metal sheet is formed of, for example, metallic Kovar that is an alloy of iron, nickel, and cobalt or stainless steel, and the plurality of through-holes 859 are formed in the rectangular metal sheet.

Figure 15B:
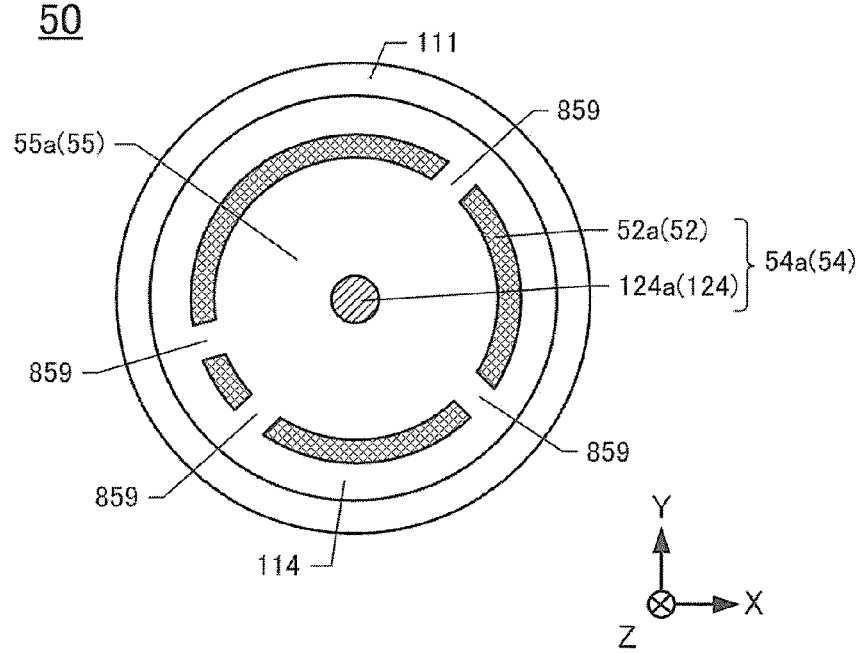
FIG. 15B is a cross-sectional view taken along the line XVB-XVB of FIG. 15A.

FIG. 15B is a cross-sectional view taken along the line XVB-XVB of FIG. 15A. The anode electrode 124a is disposed on the central axis of the cathode electrode 52a. Accordingly, when a voltage is applied between the cathode electrode 52a and the anode electrode 124a, inside the XY plane, the electric field of the space 55a surrounded by the cathode electrode 52a is formed with rotational symmetry around the anode electrode 124a. In addition, in the space 114 which has the space 55a, an inert gas and a quenching gas are enclosed. In the Geiger-Muller counter tube 50, the formation of the plurality of through-holes 859 enables the inert gas and the quenching gas to flow easily and freely inside and outside of the space 55a. Thus, the concentration difference of the inert gas and the quenching gas inside and outside of the space 55a can be reduced.

[Configuration of Geiger-Muller Counter Tube 60]

Figure 16A:
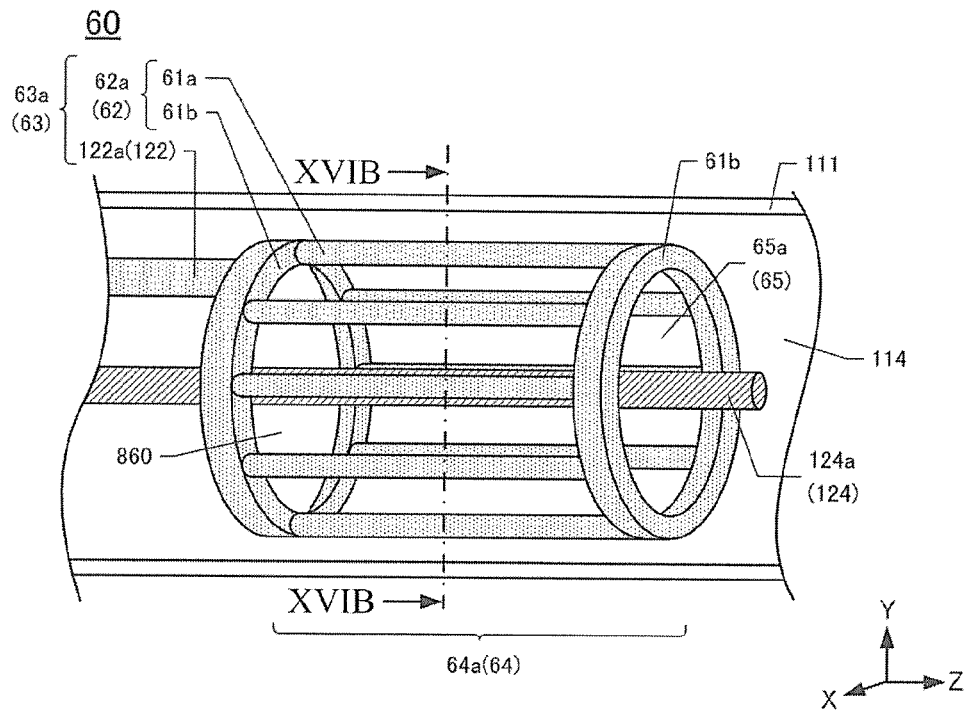
FIG. 16A is a partial perspective view of a Geiger-Muller counter tube 60.

FIG. 16A is a partial perspective view of the Geiger-Muller counter tube 60. The Geiger-Muller counter tube 60 is constituted of the enclosing tube 111, the anode conductor 124, and a cathode conductor 63. The Geiger-Muller counter tube 60 is one where, in the Geiger-Muller counter tube 110 (see FIG. 1A), the cathode electrode 121 is replaced to a cathode electrode 62, and the other configuration is the same as the Geiger-Muller counter tube 110. Further, in the FIG. 16A, only half of the perspective view of the −Z-axis side of the Geiger-Muller counter tube 60 is illustrated.

The cathode conductor 63 is constituted of a first cathode conductor 63a and a second cathode conductor 63b (not illustrated). The first cathode conductor 63a is disposed in the −Z-axis side of the Geiger-Muller counter tube 60, and the second cathode conductor 63b is disposed in the +Z-axis side of the Geiger-Muller counter tube 60. The first cathode conductor 63a includes a cathode electrode 62a, and the second cathode conductor 63b includes a cathode electrode 62b. In addition, in the Geiger-Muller counter tube 60, the anode electrode 124a and the cathode electrode 62a constitute a first radiation detecting unit 64a which detects the radiation. The first radiation detecting unit 64a has a space 65a which is the space to detect the radiation. The space 65a is the space which is surrounded by the cathode electrode 62a and is the region which includes both of the anode electrode 124a and the cathode electrode 62a inside a XY plane inside the space. Further, the cathode electrode 62a and the cathode electrode 62b have the same shape. The anode electrode 124b and the cathode electrode 62b constitute a second radiation detecting unit 64b (not illustrated) which detects the radiation, and a space 65b (not illustrated) which is the space to detect the radiation is formed.

The cathode electrode 62a is constituted of a pair of metal frames 61b and a plurality of metal rods 61a. The metal frames 61b are disposed facing one another in the Z-axis direction. The plurality of metal rods 61a is disposed so as to connect the pair of metal frames 61b. Each metal frame 61b is formed in a shape of a ring. The cathode electrode 62a is formed with eight metal rods 61a disposed at regular intervals around the peripheral area of each metal frame 61b between the pair of metal frames 61b. In addition, FIG. 16A illustrates the example formed of eight metal rods 61a; however, the number of the metal rod 61a is not limited to eight and may be more than eight or less than eight. In the cathode electrode 62a, the gap between each metal rod becomes a through-hole 860 which passes through the side surface of the cathode electrode 62a.

Figure 16B:
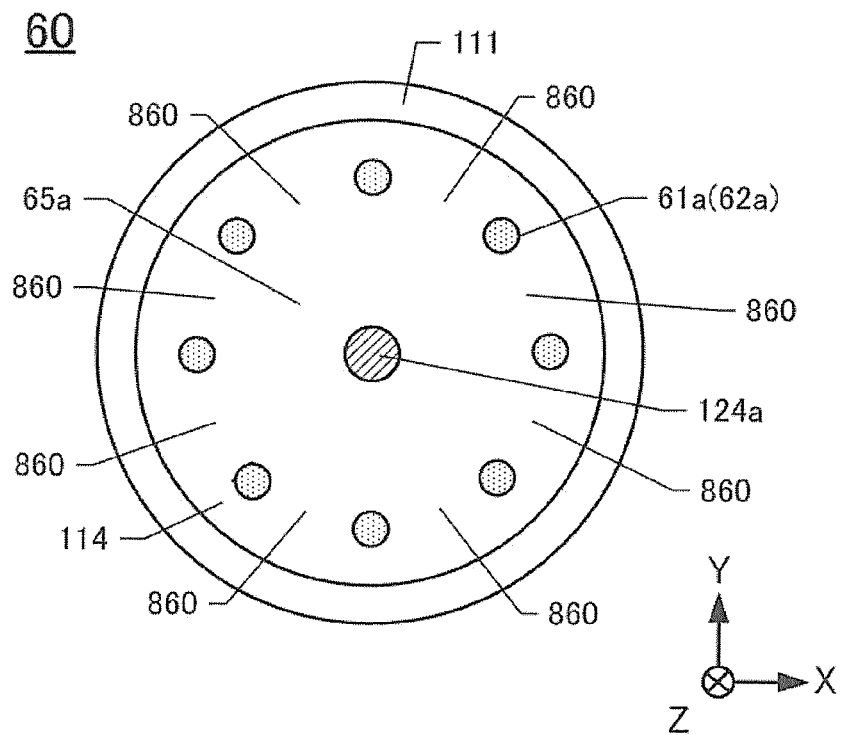
FIG. 16B is a cross-sectional view taken along the line XVIB-XVIB of FIG. 16A.

FIG. 16B is a cross-sectional view taken along the line XVIB-XVIB of FIG. 16A. The anode electrode 124a is disposed on the central axis of the cathode electrode 62a. Accordingly, when a voltage is applied between the cathode electrode 62a and the anode electrode 124a, inside the XY plane, the electric field of the space 65a surrounded by the cathode electrode 62a is formed with rotational symmetry around the anode electrode 124a. In addition, in the space 114 which has the space 65a, an inert gas and a quenching gas are enclosed. In the Geiger-Muller counter tube 60, the formation of the plurality of through-holes 860 enables the inert gas and the quenching gas to flow easily and freely inside and outside of the space 65a. Thus, the concentration difference of the inert gas and the quenching gas inside and outside of the space 65a can be reduced.

[Configuration of Geiger-Muller Counter Tube 70]

Figure 17A:
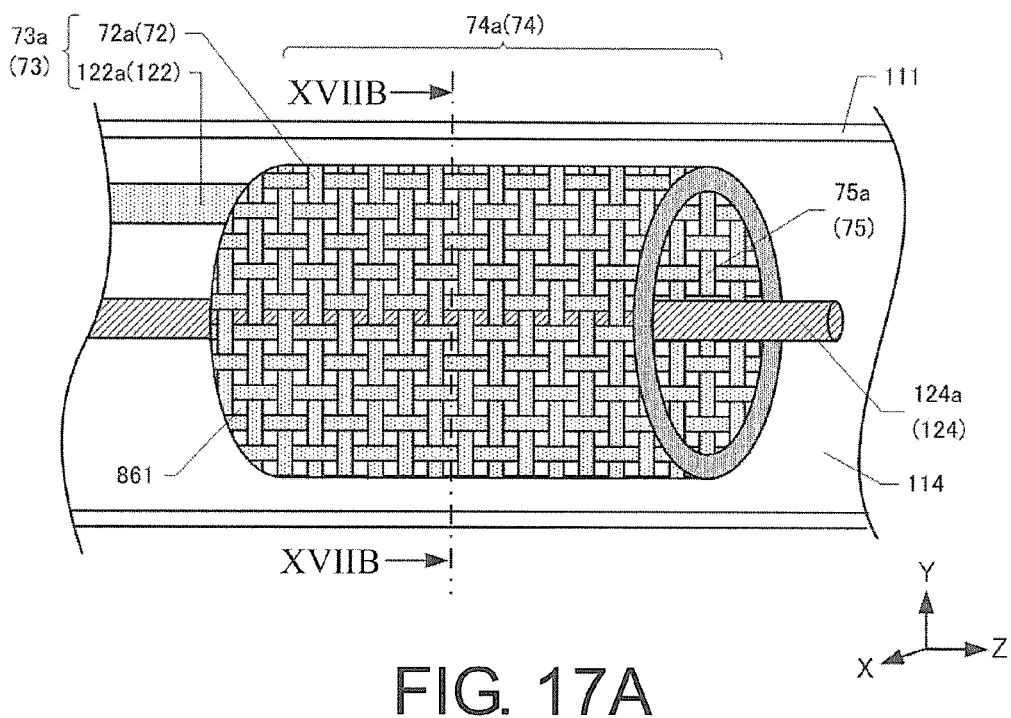
FIG. 17A is a partial perspective view of a Geiger-Muller counter tube 70.

FIG. 17A is a partial perspective view of the Geiger-Muller counter tube 70. The Geiger-Muller counter tube 70 is constituted of the enclosing tube 111, the anode conductor 124, and a cathode conductor 73. The Geiger-Muller counter tube 70 is one where, in the Geiger-Muller counter tube 110 (see FIG. 1A), the cathode electrode 121 is replaced to a cathode electrode 72, and the other configuration is the same as the Geiger-Muller counter tube 110. Further, in the FIG. 17A, only half of the perspective view of the −Z-axis side of the Geiger-Muller counter tube 70 is illustrated.

The cathode conductor 73 is constituted of a first cathode conductor 73a and a second cathode conductor 73b (not illustrated). The first cathode conductor 73a is disposed in the −Z-axis side of the Geiger-Muller counter tube 70, and the second cathode conductor 73b is disposed in the +Z-axis side of the Geiger-Muller counter tube 70. The first cathode conductor 73a includes a cathode electrode 72a, and the second cathode conductor 73b includes a cathode electrode 72b. In addition, in the Geiger-Muller counter tube 70, the anode electrode 124a and the cathode electrode 72a constitute a first radiation detecting unit 74a which detects the radiation. The first radiation detecting unit 74a has a space 75a which is the space to detect the radiation. The space 75a is the space which is surrounded by the cathode electrode 72a and is the region which includes both of the anode electrode 124a and the cathode electrode 72a inside a XY plane inside the space. Further, the cathode electrode 72a and the cathode electrode 72b have the same shape. The anode electrode 124b and the cathode electrode 72b constitute a second radiation detecting unit 74b (not illustrated) which detects the radiation, and a space 75b (not illustrated) which is the space to detect the radiation is formed.

The cathode electrode 72a is formed where a mesh of metal having a rectangular outer shape is rolled into a cylindrical shape. The mesh is formed into a grid pattern by being tied and interwoven with metal wires. The metal wire is formed of, for example, metallic Kovar that is an alloy of iron, nickel, and cobalt or stainless steel or similar material. The gap (mesh patterns) between the metal wires of the mesh becomes a through-hole 861 which passes through the cathode electrode 72a.

Figure 17B:
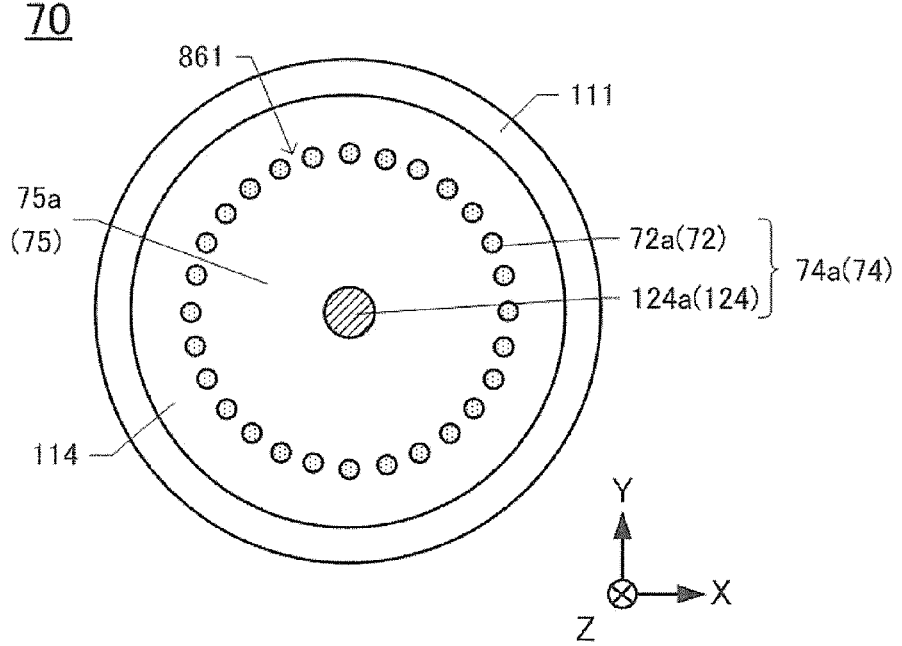
FIG. 17B is a cross-sectional view taken along the line XVIIB-XVIIB of FIG. 17A.

FIG. 17B is a cross-sectional view taken along the line XVIIB-XVIIB of FIG. 17A. The anode electrode 124a is disposed on the central axis of the cathode electrode 72a. Accordingly, when a voltage is applied between the cathode electrode 72a and the anode electrode 124a, inside the XY plane, the electric field of the space 75a surrounded by the cathode electrode 72a is formed with rotational symmetry around the anode electrode 124a. In addition, in the space 114 which has the space 75a, an inert gas and a quenching gas are enclosed. In the Geiger-Muller counter tube 70, the formation of the plurality of through-holes 861 in the cathode electrode 72a enables the inert gas and the quenching gas flow easily and freely inside and outside of the space 75a. Thus, the concentration difference of the inert gas and the quenching gas inside and outside of the space 75a can be reduced.

[Configuration of Geiger-Muller Counter Tube 80]

Figure 18A:
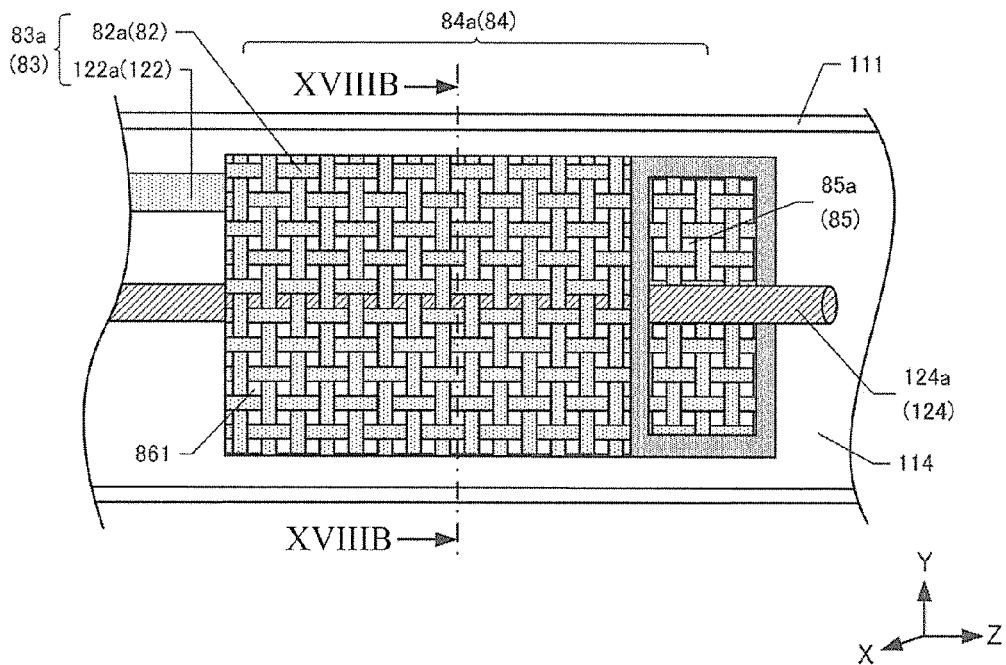
FIG. 18A is a partial perspective view of a Geiger-Muller counter tube 80.

FIG. 18A is a partial perspective view of the Geiger-Muller counter tube 80. The Geiger-Muller counter tube 80 is constituted of the enclosing tube 111, the anode conductor 124, and a cathode conductor 83. The Geiger-Muller counter tube 80 is one where, in the Geiger-Muller counter tube 110 (see FIG. 1A), the cathode electrode 121 is replaced to a cathode electrode 82, and the other configuration is the same as the Geiger-Muller counter tube 110. Further, in the FIG. 18A, only half of the perspective view of the −Z-axis side of the Geiger-Muller counter tube 80 is illustrated.

The cathode conductor 83 includes the cathode electrode 82 and the second metal lead portion 122. The cathode electrode 82 is one where the outer shape of the cathode electrode 72 (see FIG. 17A) is formed in a rectangular cylindrical shape. That is, the cathode electrode 82 is, similar to the cathode electrode 72, formed of the mesh of metal. Further, the cathode electrode 82 includes a cathode electrode 82a and a cathode electrode 82b (not illustrated). The cathode electrode 82a is disposed in the −Z-axis side of the enclosing tube 111, and the cathode electrode 82b is disposed in the +Z-axis side of the enclosing tube 111. In the Geiger-Muller counter tube 80, the anode electrode 124a and the cathode electrode 82a constitute a first radiation detecting unit 84a which detects the radiation. The first radiation detecting unit 84a has a space 85a which is the space to detect the radiation. The space 85a is the space which is surrounded by the cathode electrode 82a and is the region which includes both of the anode electrode 124a and the cathode electrode 82a inside a XY plane inside the space. Further, the cathode electrode 82a and cathode electrode 82b have the same shape. The anode electrode 124b and cathode electrode 82b constitute a second radiation detecting unit 84b (not illustrated) which detects the radiation, and a space 85b (not illustrated) which is the space to detect the radiation is formed.

Figure 18B:
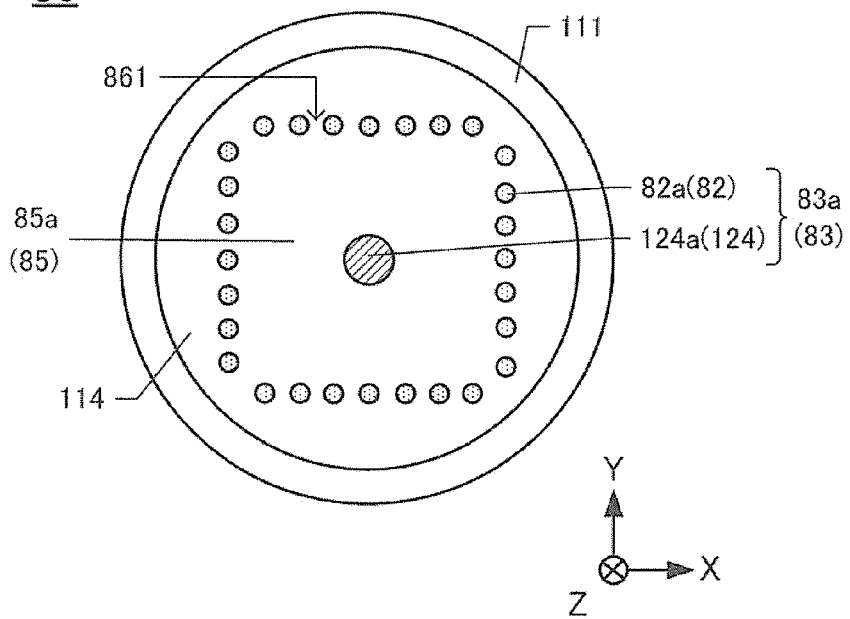
FIG. 18B is a cross-sectional view taken along the line XVIIIB-XVIIIB of FIG. 18A.

FIG. 18B is a cross-sectional view taken along the line XVIIIB-XVIIIB of FIG. 18A. The anode electrode 124a is disposed on the central axis of the cathode electrode 82a. Accordingly, when a voltage is applied between the cathode electrode 82a and the anode electrode 124a, inside the XY plane, the electric field of the space 85a surrounded by the cathode electrode 82a is formed with 4-fold symmetry around the anode electrode 124a. In addition, in the space 114 which has the space 85a, an inert gas and a quenching gas are enclosed. In the Geiger-Muller counter tube 80, the formation of the plurality of through-holes 861 in the cathode electrode 82a enables the inert gas and the quenching gas to flow easily and freely inside and outside of the space 85a. Thus, the concentration difference of the inert gas and the quenching gas inside and outside of the space 85a can be reduced.

The cathode electrode 82 is formed in a rectangular-cylindrical shape; however, it may be formed in various shapes such as an elliptical-cylindrical shape or a polygonal-cylindrical shape. Furthermore, the cathode electrodes 42, 52, and 62 may be formed in various shapes such as the rectangular-cylindrical shape, an elliptical-cylindrical shape or a polygonal-cylindrical shape.

[Configuration of Geiger-Muller Counter Tube 90]

Figure 19A:
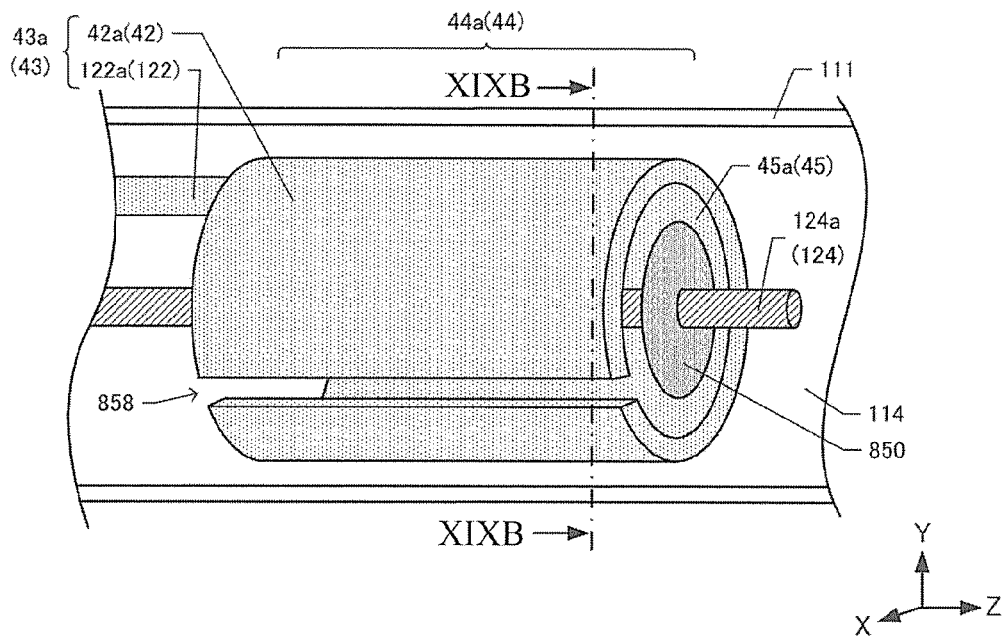
FIG. 19A is a partial perspective view of a Geiger-Muller counter tube 90.

FIG. 19A is a partial perspective view of the Geiger-Muller counter tube 90. The Geiger-Muller counter tube 90 is constituted of the enclosing tube 111, the anode conductor 124, and the cathode conductor 43, and the bead 850. The Geiger-Muller counter tube 90 is one where, in the Geiger-Muller counter tube 810 (see FIG. 10A), the cathode electrode 121 is replaced to the cathode electrode 42 (see FIG. 14A), and the other configuration is the same as the Geiger-Muller counter tube 810. Further, in the FIG. 19A, only half of the perspective view of the −Z-axis side of the Geiger-Muller counter tube 90 is illustrated.

In the Geiger-Muller counter tube 810 (see FIG. 10A), there is a concern that the bead 850 closes the opening of the cathode electrode 121, and a flow of the gas inside the enclosing tube 111 becomes poor. Accordingly, there is a concern that the characteristics of the Geiger-Muller counter tube are affected due to generation of a concentration difference of the gas inside the enclosing tube 111. In the Geiger-Muller counter tube 90, the cathode electrode 42 where the through-hole 858 is formed in its side surface is employed. Thus, ventilation of the gas inside and outside of the cathode electrode 42 is improved, and generation of the concentration difference of the gas inside and outside of the cathode electrode 42 is prevented.

Figure 19B:
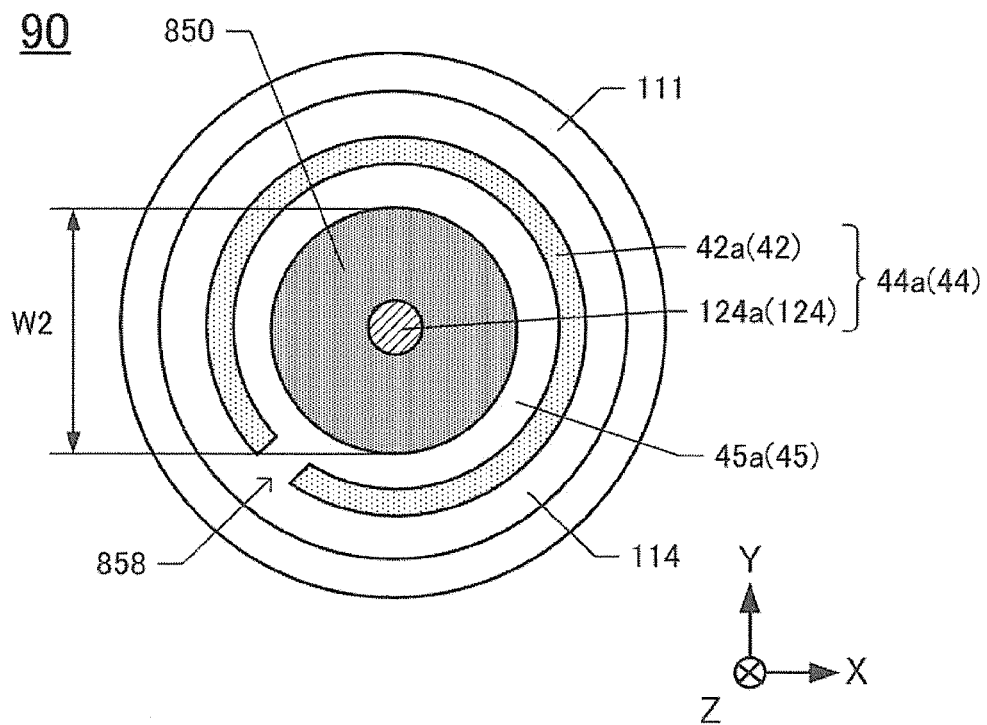
FIG. 19B is a cross-sectional view taken along the line XIXB-XIXB of FIG. 19A.

FIG. 19B is a cross-sectional view taken along the line XIXB-XIXB of FIG. 19A. In the Geiger-Muller counter tube 90, as illustrated in FIG. 19B, the outside diameter W2 of the bead 850 is formed large. Thus, the anode electrode 124 is disposed in the position which is closer to the central axis of the cathode electrode 121, and the variation of the characteristics of the Geiger-Muller counter tube 90 is suppressed. In the Geiger-Muller counter tube 90, the use of the cathode electrode 42 having the through-hole 858 in its side surface prevents generation of the concentration difference of the gas in the inside and outside of the cathode electrode 42. Accordingly, even if the outside diameter W2 of the bead 850 is formed larger than that of the Geiger-Muller counter tube 810 (see FIG. 10A), the concentration difference of the gas inside and outside of the cathode electrode 42 is less likely to occur.

In the Geiger-Muller counter tube 90, the cathode electrode 42 is employed; however, instead of the cathode electrode 42, other cathode electrode such as the cathode electrode 52 (see FIG. 15A), the cathode electrode 62 (see FIG. 16A), the cathode electrode 72 (see FIG. 17A), and the cathode electrode 82 (see FIG. 18A) may be employed. Furthermore, instead of the bead 850, other bead such as the bead 852 (see FIG. 11A), the bead 853 (see FIG. 11B), the bead 856 (see FIG. 12A), or the ring 857 (see FIG. 13A) may be employed.

[Configuration of Geiger-Muller Counter Tube 910]

Figure 20A:
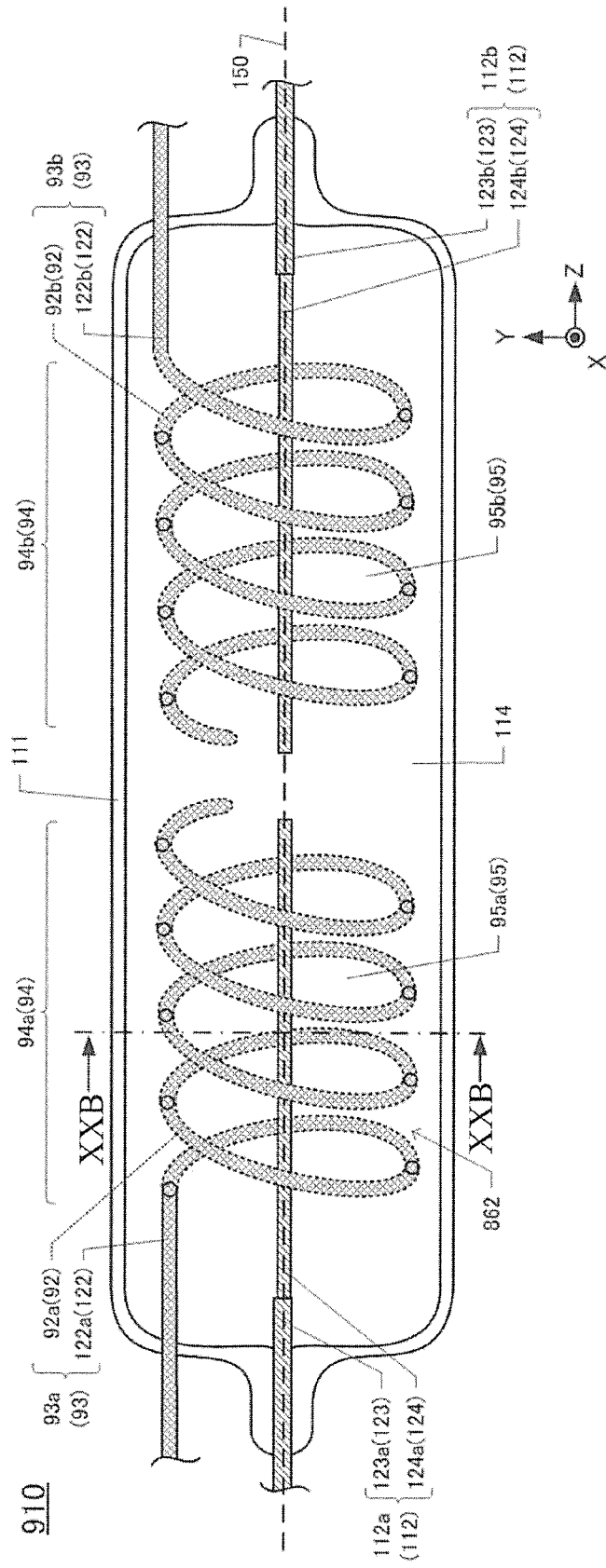
FIG. 20A is a cross-sectional view of a Geiger-Muller counter tube 910.

FIG. 20A is a cross-sectional view of the Geiger-Muller counter tube 910. The Geiger-Muller counter tube 910 is constituted of the enclosing tube 111, the anode conductor 112, and a cathode conductor 93. The cathode conductor 93 is constituted of a cathode electrode 92 and a linear second metal lead portion 122. The cathode electrode 92 is formed as a winding to be wound on the peripheral area of the anode electrode 124 in the space 114 at a constant distance from the anode electrode 124. The second metal lead portion 122 is connected to the cathode electrode 92 and is supported at the end of the enclosing tube 111. The cathode electrode 92 forms a through-hole 862 between the windings through which the cathode electrode 92 passes. In the Geiger-Muller counter tube 910, the formation of the plurality of through-holes 862 in the cathode electrode 92 enables the inert gas and the quenching gas to flow easily and freely inside and outside of a space 95. Thus, the concentration difference of the inert gas and the quenching gas inside and outside of the space 95 can be reduced.

In the Geiger-Muller counter tube 910, the cathode conductor 93 is constituted of a first cathode conductor 93a and a second cathode conductor 93b. The first cathode conductor 93a is disposed in the −Z-axis side in the space 114, and the second cathode conductor 93b is disposed in the +Z-axis side in the space 114. The first cathode conductor 93a is constituted of a cathode electrode 92a and the second metal lead portion 122a, and the second cathode conductor 93b is constituted of a cathode electrode 92b and the second metal lead portion 122b. The Geiger-Muller counter tube 910 is one where, in the Geiger-Muller counter tube 110 (see FIG. 1A), the cathode electrode 121 is replaced to the cathode electrode 92, and the other configuration is the same as the Geiger-Muller counter tube 110. In FIG. 20A, for description, the cathode electrode 92 that is not seen on the cross section is illustrated by dotted lines.

In the Geiger-Muller counter tube 910, the anode electrode 124a and the cathode electrode 92a constitute a first radiation detecting unit 94a which detects the radiation. The first radiation detecting unit 94a has a space 95a which is the space to detect the radiation. The space 95a is the space which is surrounded by the cathode electrode 92a and is the region which includes both of the anode electrode 124a and the cathode electrode 92a inside the XY plane in the space. Further, the cathode electrode 92a and the cathode electrode 92b have the same shape. The anode electrode 124a and the cathode electrode 92b constitute a second radiation detecting unit 94b which detects the radiation, and a space 95b which is the space to detect the radiation is formed.

Figure 20B:
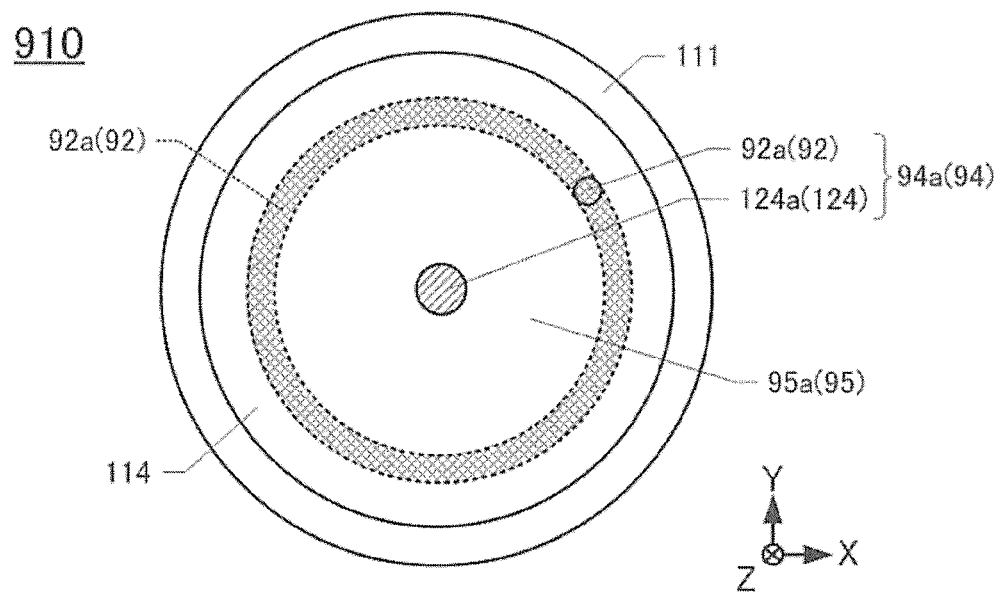
FIG. 20B is a cross-sectional view taken along the line XXB-XXB of FIG. 20A.

FIG. 20B is a cross-sectional view taken along the line XXB-XXB of FIG. 20A. In FIG. 20B, for description, the cathode electrode 92a that is not seen on the cross section taken along the line XXB-XXB is illustrated by dotted lines. The anode electrode 124a is disposed on the central axis of the cathode electrode 92a. Accordingly, when a voltage is applied between the cathode electrode 92a and the anode electrode 124a, inside the XY plane, the electric field of the space 95a surrounded by the cathode electrode 92a is formed with rotational symmetry around the anode electrode 124a.

The aforementioned example of the fifth embodiment can be employed to the embodiments from the first embodiment to the fourth embodiment. Further, the example of the sixth embodiment can be employed to the embodiments from the first embodiment to the fifth embodiment.

The disclosure may be configured as follows. A Geiger-Muller counter tube according to the disclosure includes a cylindrical enclosing tube, an anode electrode, a cylindrical cathode electrode, an inert gas, and a quenching gas. The cylindrical enclosing tube has a sealed space. The anode electrode is disposed inside the space and formed in a rod shape. The cylindrical cathode electrode surrounds a peripheral area of the anode electrode inside the space to have an opening. The inert gas and the quenching gas are sealed inside the space. At least one of the anode electrode and the cathode electrode is included in plurality inside the enclosing tube.

In the Geiger-Muller counter tube according to the first aspect, the Geiger-Muller counter tube according to a second aspect may further include a bead formed of an insulator having a through-hole at a center of the bead. The anode electrode passes through the through-hole to secure the bead to the anode electrode. The bead is disposed so as to be surrounded by the cathode electrode.

In the Geiger-Muller counter tube according to the first aspect, the Geiger-Muller counter tube according to a third aspect may further include a ring formed of an insulator having an inside diameter smaller than a diameter of the opening of the cathode electrode. The ring is disposed at the opening. The anode electrode passes through inside the inside diameter of the ring. The ring prevents a direct contact between the anode electrode and the cathode electrode.

In the Geiger-Muller counter tube according to the first or second aspect, the Geiger-Muller counter tube according to a fourth aspect may be configured as follows. The cathode electrode is formed as a winding to surround the peripheral area of the anode electrode.

In the Geiger-Muller counter tube according to any one of the first to third aspects, the Geiger-Muller counter tube according to a fifth aspect may be configured as follows. The cathode electrode is formed of a metal sheet in a cylindrical shape and has a side surface through which a through-hole is formed.

In the Geiger-Muller counter tube according to any one of the first to fifth aspects, the Geiger-Muller counter tube according to a sixth aspect may be configured as follows. The anode electrode includes a first anode electrode and a second anode electrode formed on a straight line. The cathode electrode has a central axis disposed on the straight line. The first anode electrode and the second anode electrode are disposed apart one another at both end sides of the cathode electrode. The first anode electrode and the cathode electrode constitute a first radiation detecting unit detecting radiations. The second anode electrode and the cathode electrode constitute a second radiation detecting unit different from the first radiation detecting unit.

In the Geiger-Muller counter tube according to any one of the first to fifth aspects, the Geiger-Muller counter tube according to a seventh aspect may be configured as follows. The cathode electrode includes a first cathode electrode and a second cathode electrode. A central axis of the first cathode electrode and a central axis of the second cathode electrode are disposed on a straight line. The anode electrode is disposed on the straight line. The first cathode electrode and the second cathode electrode are disposed apart one another at both sides of the anode electrode so as to constitute a first radiation detecting unit and a second radiation detecting unit.

In the Geiger-Muller counter tube according to any one of the first to fifth aspects, the Geiger-Muller counter tube according to an eighth aspect may be configured as follows. The anode electrode includes a first anode electrode and a second anode electrode disposed on a straight line. The cathode electrode includes a first cathode electrode and a second cathode electrode. A central axis of the first cathode electrode and a central axis of the second cathode electrode are disposed on the straight line. The first anode electrode and the first cathode electrode, and the second anode electrode and the second cathode electrode are disposed apart one another so as to constitute a first radiation detecting unit and a second radiation detecting unit.

In the Geiger-Muller counter tube according to any one of the sixth to eighth aspects, the Geiger-Muller counter tube according to a ninth aspect may further include a shielding portion that blocks n-ray by surrounding a peripheral area of the first radiation detecting unit from the outside of the enclosing tube.

A radiation measurement apparatus according to a tenth aspect may include the Geiger-Muller counter tube according to the sixth aspect to ninth aspect, a first high voltage circuit, and a second high voltage circuit. The first high voltage circuit applies a voltage to the first radiation detecting unit. The second high voltage circuit applies a voltage to the second radiation detecting unit.

A radiation measurement apparatus according to an eleventh aspect may include the Geiger-Muller counter tube according to the ninth aspect, a calculator, and a position determining unit. The calculator receives an output of $\beta$-ray detection amount and $\gamma$-ray detection amount from the first radiation detecting unit and the second radiation detecting unit. The calculator performs an arithmetic mean or a difference calculation. The position determining unit determines a first position and a second position. The shielding portion surrounds the first radiation detecting unit at the first position. The shielding portion does not surround the first radiation detecting unit at the second position. When the position determining unit determines that the shielding portion is at the first position, the calculator performs a difference calculation on outputs of $\beta$-ray detection amount and $\gamma$-ray detection amount received from the first radiation detecting unit and the second radiation detecting unit. When the position determining unit determines that the shielding portion is at the second position, the calculator performs an arithmetic mean on outputs of $\beta$-ray detection amount and $\gamma$-ray detection amount received from the first radiation detecting unit and the second radiation detecting unit.

A radiation measurement apparatus according to a twelfth aspect may include the Geiger-Muller counter tube according to the ninth aspect and a calculator. The calculator receives outputs of $\beta$-ray detection amount and $\gamma$-ray detection amount from the first radiation detecting unit and the second radiation detecting unit to perform a difference calculation.

A radiation measurement apparatus according to a thirteenth aspect may include the Geiger-Muller counter tube according to the first aspect to eighth aspect, one single high voltage circuit unit, a counter, and a calculator. The one single high voltage circuit unit applies a predetermined high voltage between the anode electrode and the cathode electrode. The counter is connected to the high voltage circuit unit. The counter counting pulse signals are measured by the Geiger-Muller counter tube. The calculator converts the pulse signal counted by the counter into a radiation dose.

According to the Geiger-Muller counter tube and radiation measurement apparatus of this disclosure, measurement can be performed easily, and the detection sensitivity of the radiation can be increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A Geiger-Muller counter tube, comprising:
   a cylindrical enclosing tube, having a space which is sealed;
   an anode electrode, being disposed inside the space, and the anode electrode is formed in a rod shape;
   a cathode electrode in a cylindrical shape, surrounding a peripheral area of the anode electrode inside the space, and the cathode electrode having an opening; and
   an inert gas and a quenching gas, being sealed inside the space, wherein
   at least one of the anode electrode and the cathode electrode includes a plurality of electrodes inside the enclosing tube to at least form a first radiation detecting unit and a second radiation detecting unit; and
   a shielding portion that blocks β-ray by surrounding a peripheral area of the first radiation detecting unit from the outside of the enclosing tube.

2. The Geiger-Muller counter tube according to claim 1, further comprising:
   a bead, being formed of an insulator, and a through-hole is in a center of the bead, and the anode electrode passing through the through-hole to secure the bead to the anode electrode,
   wherein the bead is disposed so as to be surrounded by the cathode electrode.

3. The Geiger-Muller counter tube according to claim 1, further comprising:
   a ring, being formed of an insulator, and the ring having an inside diameter smaller than a diameter of the opening of the cathode electrode, and the ring being disposed at the opening,
   wherein the anode electrode passes through the inside of the inside diameter of the ring, and
   the ring prevents a direct contact between the anode electrode and the cathode electrode is prevented by using the ring.

4. The Geiger-Muller counter tube according to claim 1, wherein
   the cathode electrode is formed as a winding to surround the peripheral area of the anode electrode.

5. The Geiger-Muller counter tube according to claim 1, wherein
   the cathode electrode is formed of a metal sheet in a cylindrical shape and has a side surface through which a through-hole is formed.

6. The Geiger-Muller counter tube according to claim 1, wherein
   the anode electrode includes a first anode electrode and a second anode electrode formed on a straight line,
   the cathode electrode has a central axis disposed on the straight line, and
   the first anode electrode and the second anode electrode are disposed apart one another at both end sides of the cathode electrode,
   the first anode electrode and the cathode electrode constitute the first radiation detecting unit for detecting radiations, and
   the second anode electrode and the cathode electrode constitute the second radiation detecting unit different from the first radiation detecting unit.

7. The Geiger-Muller counter tube according to claim 1, wherein
   the cathode electrode includes a first cathode electrode and a second cathode electrode,
   a central axis of the first cathode electrode and a central axis of the second cathode electrode are disposed on a straight line,
   the anode electrode is disposed on the straight line, and
   the first cathode electrode and the second cathode electrode are disposed apart one another at both sides of the anode electrode so as to constitute the first radiation detecting unit and the second radiation detecting unit.

8. The Geiger-Muller counter tube according to claim 1, wherein
   the anode electrode includes a first anode electrode and a second anode electrode disposed on a straight line,
   the cathode electrode includes a first cathode electrode and a second cathode electrode,
   a central axis of the first cathode electrode and a central axis of the second cathode electrode are disposed on the straight line,
   the first anode electrode and the first cathode electrode, and the second anode electrode and the second cathode electrode are disposed apart one another so as to constitute the first radiation detecting unit and the second radiation detecting unit.

9. A radiation measurement apparatus, comprising:
   the Geiger-Muller counter tube according to claim 6;
   a first high voltage circuit; and
   a second high voltage circuit,
   wherein the first high voltage circuit applies a voltage to the first radiation detecting unit, and
   the second high voltage circuit applies a voltage to the second radiation detecting unit.

10. A radiation measurement apparatus, comprising:
    the Geiger-Muller counter tube according to claim 1;
    a calculator that receives an output of β-ray detection amount and γ-ray detection amount from the first radiation detecting unit and the second radiation detecting unit, and the calculator performing an arithmetic mean or a difference calculation; and
    a position determining unit that determines a first position and a second position, the shielding portion surrounds the first radiation detecting unit at the first position, the shielding portion not surrounding the first radiation detecting unit at the second position, wherein
    when the position determining unit determines that the shielding portion is at the first position, the calculator performs a difference calculation on outputs of β-ray detection amount and γ-ray detection amount received from the first radiation detecting unit and the second radiation detecting unit, and
    when the position determining unit determines that the shielding portion is at the second position, the calculator performs an arithmetic mean on outputs of β-ray detection amount and γ-ray detection amount received from the first radiation detecting unit and the second radiation detecting unit.

11. A radiation measurement apparatus, comprising:
    the Geiger-Muller counter tube according to claim 1; and
    a calculator that receives outputs of β-ray detection amount and γ-ray detection amount from the first radiation detecting unit and the second radiation detecting unit to perform a difference calculation.

12. A radiation measurement apparatus, comprising:
    the Geiger-Muller counter tube according to claim 1;
    one single high voltage circuit unit that applies a predetermined high voltage between the anode electrode and the cathode electrode;

a counter, being connected to the high voltage circuit unit, and the counter counting pulse signals measured by the Geiger-Muller counter tube; and a calculator that converts the pulse signal counted by the counter into a radiation dose.

* * * * *